United States Patent
Sun et al.

(10) Patent No.: US 11,750,336 B2
(45) Date of Patent: Sep. 5, 2023

(54) TYPE 3 HARQ-ACK CODEBOOK ENHANCEMENTS FOR URLLC

(71) Applicant: QUALCOMM Incorporated, San Diego, CA (US)

(72) Inventors: Jing Sun, San Diego, CA (US); Yi Huang, San Diego, CA (US); Xiaoxia Zhang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 17/403,344

(22) Filed: Aug. 16, 2021

(65) Prior Publication Data

US 2022/0060288 A1 Feb. 24, 2022

Related U.S. Application Data

(60) Provisional application No. 63/067,171, filed on Aug. 18, 2020.

(51) Int. Cl.
*H04L 1/18* (2023.01)
*H04L 1/1812* (2023.01)
*H04L 1/1867* (2023.01)
*H04W 72/23* (2023.01)

(52) U.S. Cl.
CPC .......... *H04L 1/1819* (2013.01); *H04L 1/1887* (2013.01); *H04L 1/1896* (2013.01); *H04W 72/23* (2023.01)

(58) Field of Classification Search
CPC ... H04L 1/1819; H04L 1/1887; H04L 1/1896; H04W 72/23
USPC .......................................... 370/310, 328, 329
See application file for complete search history.

(56) References Cited

U.S. PATENT DOCUMENTS

2020/0314815 A1* 10/2020 Kim ....................... H04L 1/1864
2022/0045801 A1* 2/2022 Wang .................... H04W 72/23
2022/0272673 A1* 8/2022 Yang ..................... H04L 1/1861

* cited by examiner

*Primary Examiner* — Obaidul Huq
(74) *Attorney, Agent, or Firm* — Procopio, Cory. Hargreaves & Savitch

(57) ABSTRACT

This disclosure provides systems, devices, apparatus, and methods, including computer programs encoded on storage media, for Type 3 HARQ-ACK codebook enhancements for URLLC. A UE may receive a configuration for reporting HARQ-ACK feedback for a subset of HARQ process IDs included in a set of HARQ process IDs. The set of HARQ process IDs may be associated with a Type 3 HARQ-ACK codebook. The subset of HARQ process IDs may be associated with a modified Type 3 HARQ-ACK codebook that is smaller than the Type 3 HARQ-ACK codebook. The UE may receive, based on the configuration, a trigger for the modified Type 3 HARQ-ACK codebook and report, based on the trigger, the modified Type 3 HARQ-ACK codebook including the HARQ-ACK feedback for the subset of HARQ process IDs.

30 Claims, 14 Drawing Sheets

TYPE 3 HARQ-ACK CODEBOOK ENHANCEMENTS FOR URLLC

CROSS REFERENCE TO RELATED APPLICATION(S)

This application claims the benefit of and priority to U.S. Provisional Application Ser. No. 63/067,171, entitled "Type 3 HARQ-ACK Codebook Enhancements for URLLC" and filed on Aug. 18, 2020, which is expressly incorporated by reference herein in its entirety.

TECHNICAL FIELD

The present disclosure relates generally to communication systems, and more particularly, to Type 3 hybrid automatic repeat request (HARD)-acknowledgement (ACK) (HARQ-ACK) codebook enhancements for ultra-reliable low-latency communication (URLLC).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

For Type 3 HARQ-ACK codebooks, a user equipment (UE) may transmit a full acknowledgement/negative-acknowledgment (ACK/NACK) report to a base station indicative of all configured HARQ process identifiers (IDs), such that any ACK/NACKs included in transmissions that were previously dropped by the UE may be retransmitted in the full ACK/NACK report. Some ACK/NACKs may be high priority and other ACK/NACKs may be low priority. Thus, if a high priority HARQ-ACK codebook collides with a low priority HARQ-ACK codebook, the UE may drop the low priority HARQ-ACK codebook so that the high priority HARQ-ACK codebook may be reported. In Type 3 HARQ reporting, the UE may report a most recent instance of HARQ-ACK for a particular HARQ process ID. However, since high priority HARQ-ACK codebooks may not be dropped, and thus reported to the base station, reporting the HARQ-ACK codebook for a most recent instance of the HARQ process ID may be a waste of resources, if the most recent instance of the HARQ process ID corresponds to high priority ACK/NACK.

Accordingly, for Type 3 HARQ-ACK codebooks, instead of the UE reporting the most recent instance of the HARQ process IDs, a low priority mode may be implemented where the UE may report, for each HARQ process, a most recent low priority instance of the HARQ process ID. That is, if HARQ process X is initially associated with a low priority transmission in slot N but is later associated with a high priority transmission in slot M, the UE may retransmit the ACK/NACK for HARQ process X in slot N when the Type 3 codebook is triggered by the base station, rather than retransmitting the ACK/NACK for HARQ process X in slot M. In this manner, the UE may retransmit low priority instances of the HARQ process IDs, even if a particular HARQ process ID is associated with a more recent instance of high priority ACK/NACK.

In an aspect of the disclosure, a method, a computer-readable medium, and an apparatus are provided. The apparatus may receive a configuration for reporting HARQ-ACK feedback for a subset of HARQ process IDs included in a set of HARQ process IDs, the set of HARQ process IDs associated with a Type 3 HARQ-ACK codebook, the subset of HARQ process IDs associated with a modified Type 3 HARQ-ACK codebook that is smaller than the Type 3 HARQ-ACK codebook; receive, based on the configuration, a trigger for the modified Type 3 HARQ-ACK codebook; and report, based on the trigger, the modified Type 3 HARQ-ACK codebook including the HARQ-ACK feedback for the subset of HARQ process IDs.

In an aspect of the disclosure, a method, a computer-readable medium, and an apparatus are provided. The apparatus may receive a trigger for a Type 3 HARQ-ACK codebook, the Type 3 HARQ-ACK codebook based on a most recent low priority instance of a HARQ process ID; determine the most recent low priority instance of the HARQ process ID, the most recent low priority instance corresponding to at least one of an ACK or a NACK; and report the Type 3 HARQ-ACK codebook including the at least one of the ACK or the NACK corresponding to the determined most recent low priority instance of the HARQ process ID.

In an aspect of the disclosure, a method, a computer-readable medium, and an apparatus are provided. The apparatus may transmit a configuration to a user equipment (UE) for hybrid automatic repeat request (HARQ)-acknowledgment (ACK) (HARQ-ACK) feedback for a subset of HARQ process identifiers (IDs) included in a set of HARQ process IDs, the set of HARQ process IDs associated with a Type 3

HARQ-ACK codebook, the subset of HARQ process IDs associated with a modified Type 3 HARQ-ACK codebook that is smaller than the Type 3 HARQ-ACK codebook; transmit, based on the configuration, a trigger for the modified Type 3 HARQ-ACK codebook; and receive, based on the trigger, the modified Type 3 HARQ-ACK codebook including the HARQ-ACK feedback for the subset of HARQ process IDs.

In an aspect of the disclosure, a method, a computer-readable medium, and an apparatus are provided. The apparatus may configure a Type 3 HARQ-ACK codebook, the Type 3 HARQ-ACK codebook being based on a most recent low priority instance of a HARQ process ID; transmit a trigger for the Type 3 HARQ-ACK codebook; and monitor for the Type 3 HARQ-ACK codebook including at least one of an ACK or a negative ACK (NACK), the at least one of the ACK or the NACK corresponding to the most recent low priority instance of the HARQ process ID.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
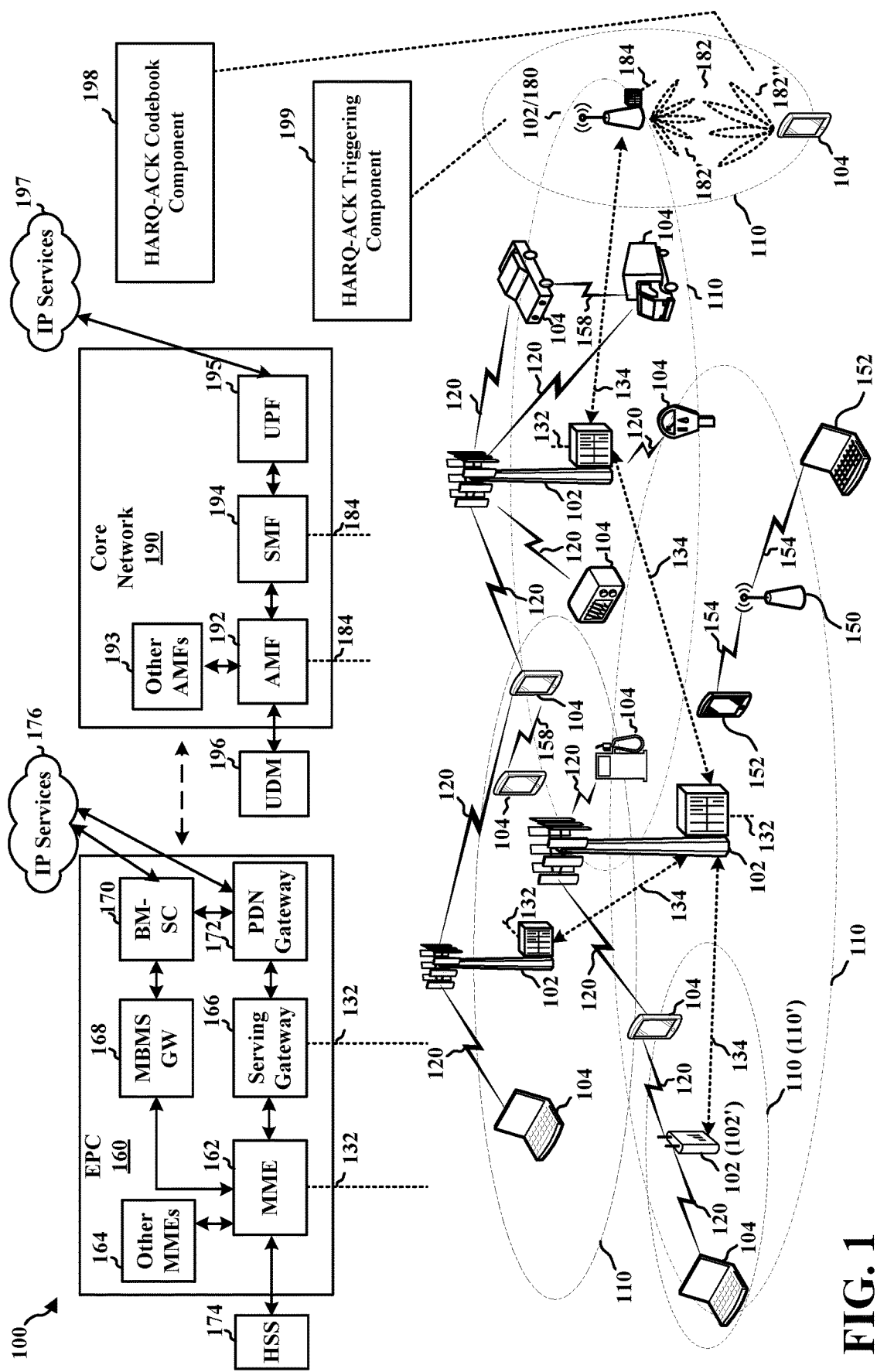
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described techniques. In some practical settings, devices incorporating described aspects and features may also include additional components and features for implementation and practice of claimed and described aspect. For example, transmission and reception of wireless signals includes a number of components for analog and digital purposes (e.g., one or more hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, user equipments (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a hybrid automatic repeat request (HARQ)-acknowledgment (ACK) (HARQ-ACK) codebook component 198 configured to receive a configuration for reporting HARQ-ACK feedback for a subset of HARQ process identifiers (IDs) included in a set of HARQ process IDs, the set of HARQ process IDs associated with a Type 3 HARQ-ACK codebook, the subset of HARQ process IDs associated with a modified Type 3 HARQ-ACK codebook that is smaller than the Type 3 HARQ-ACK codebook; receive, based on the configuration, a trigger for the modified Type 3 HARQ-ACK codebook; and report, based on the trigger, the modified Type 3 HARQ-ACK codebook including the HARQ-ACK feedback for the subset of HARQ process IDs. In further aspects, the HARQ-ACK codebook component 198 may be configured to receive a trigger for a modified Type 3 HARQ-ACK codebook, the modified Type 3 HARQ-ACK codebook based on a most recent low priority instance of a HARQ process ID, the most recent low priority instance of the HARQ process ID corresponding to at least one of an ACK or a negative ACK (NACK); and report the modified Type 3 HARQ-ACK codebook including the at least one of the ACK or the NACK based on the most recent low priority instance of the HARQ process ID.

In certain aspects, the base station 180 may include a HARQ-ACK triggering component 199 configured to transmit a configuration to a UE for HARQ-ACK feedback for a subset of HARQ process IDs included in a set of HARQ process IDs, the set of HARQ process IDs associated with a Type 3 HARQ-ACK codebook, the subset of HARQ process IDs associated with a modified Type 3 HARQ-ACK codebook that is smaller than the Type 3 HARQ-ACK codebook; transmit, based on the configuration, a trigger for the modified Type 3 HARQ-ACK codebook; and receive, based on the trigger, the modified Type 3 HARQ-ACK codebook including the HARQ-ACK feedback for the subset of HARQ process IDs. In further aspects, the HARQ-ACK triggering component 199 may be configured to configure a modified Type 3 HARQ-ACK codebook, the modified Type 3 HARQ-ACK codebook being based on a most recent low priority instance of a HARQ process ID; transmit a trigger for the modified Type 3 HARQ-ACK codebook; and monitor for the modified Type 3 HARQ-ACK codebook including at least one of an ACK or a NACK, the at least one of the ACK or the NACK corresponding to the most recent low priority instance of the HARQ process ID. Although the following description may be focused on 5G NR, the concepts described herein may be applicable to other similar areas, such as LTE, LTE-A, CDMA, GSM, and other wireless technologies.

Figure 2:
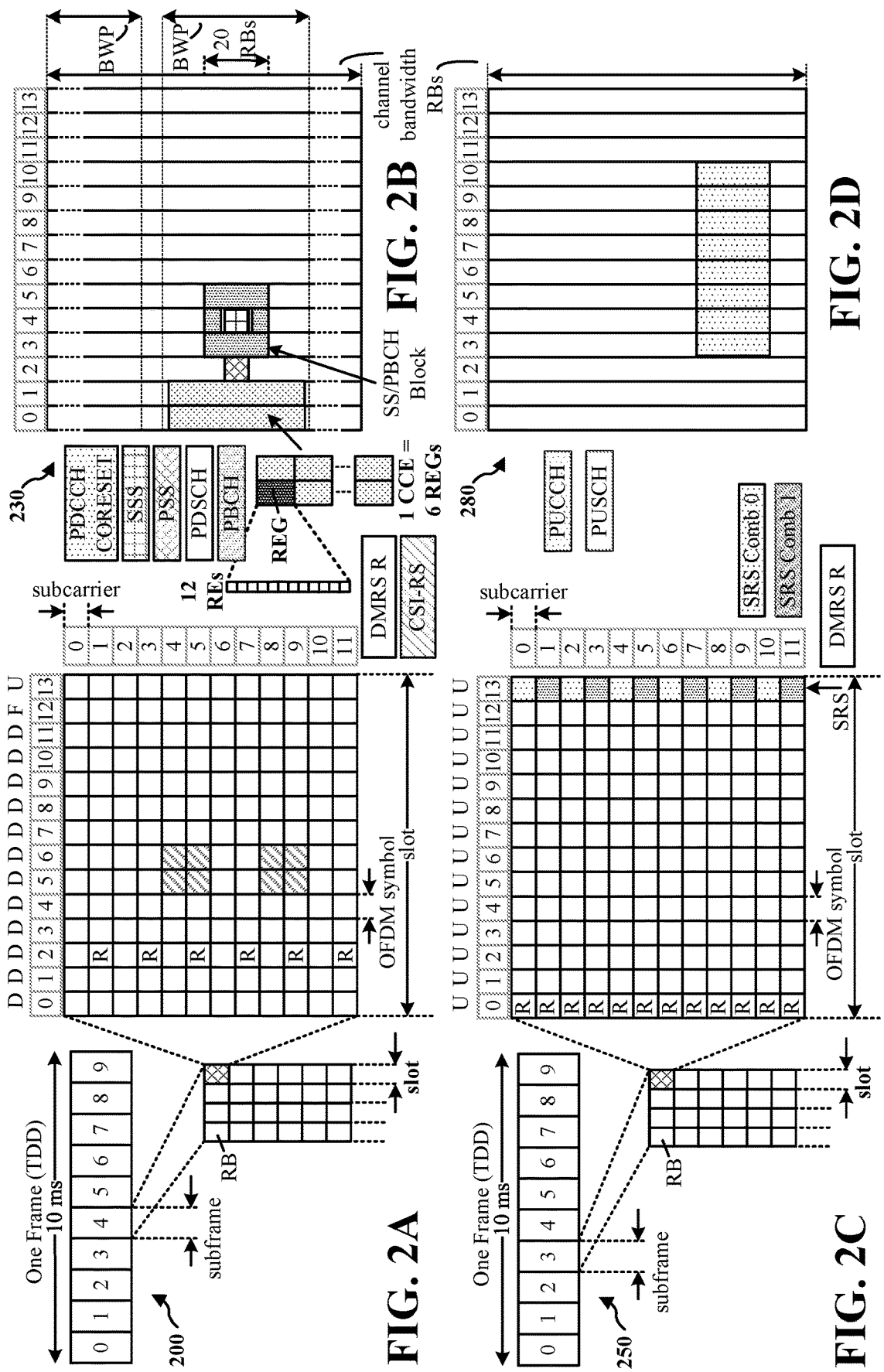
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB)

(also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ acknowledgement/negative acknowledgment (ACK/NACK) feedback. The PUSCH carries data, and may additionally be used to carry a buffer status report (BSR), a power headroom report (PHR), and/or UCI.

Figure 3:
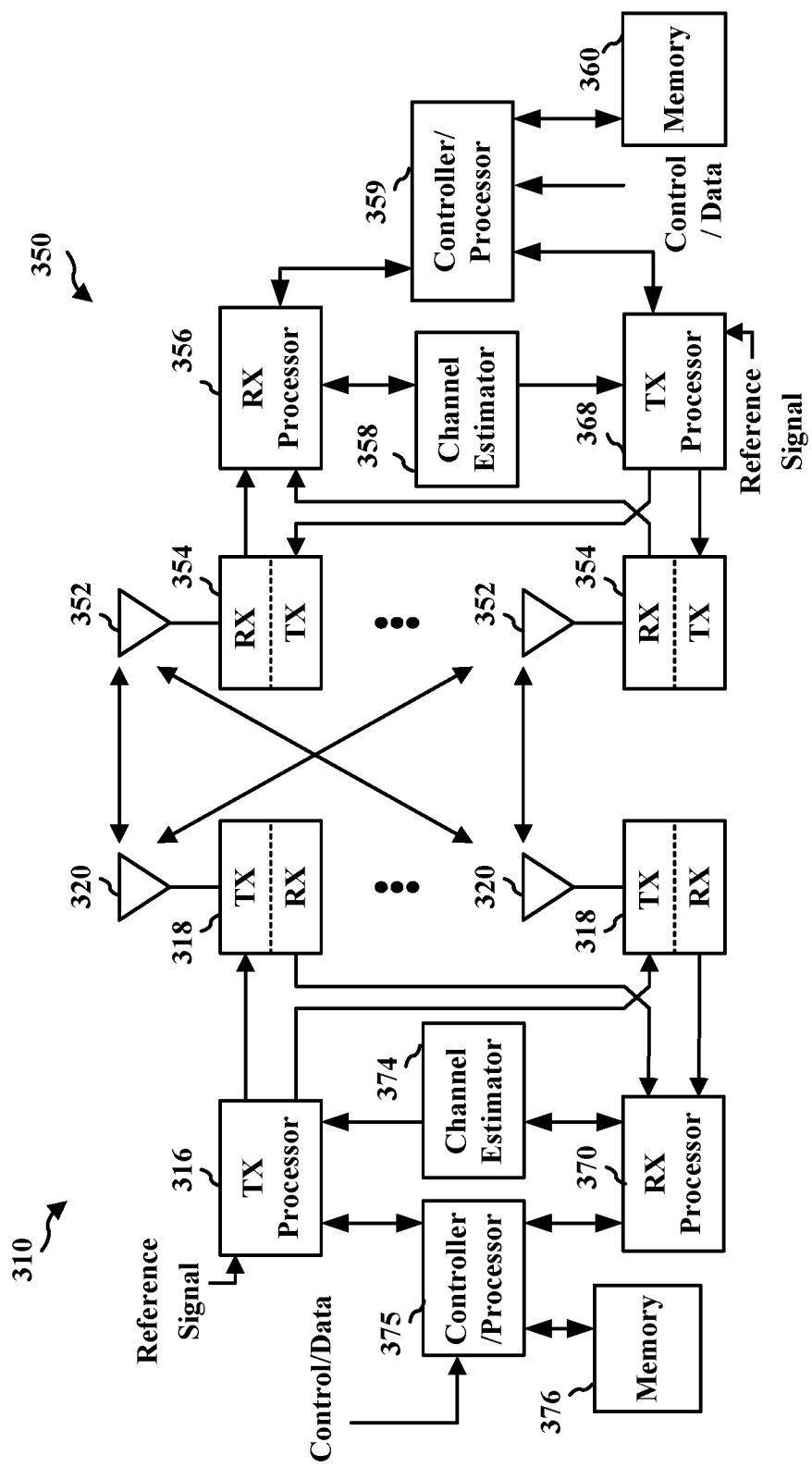
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the HARQ-ACK codebook component 198 of FIG. 1.

At least one of the TX processor 316, the RX processor 370, and the controller/processor 375 may be configured to perform aspects in connection with the HARQ-ACK triggering component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc., that support communication with multiple users. In many cases, common protocols that facilitate communications with wireless devices are adopted in various telecommunication standards. For example, communication methods associated with eMBB, mMTC, and ultra-reliable low-latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
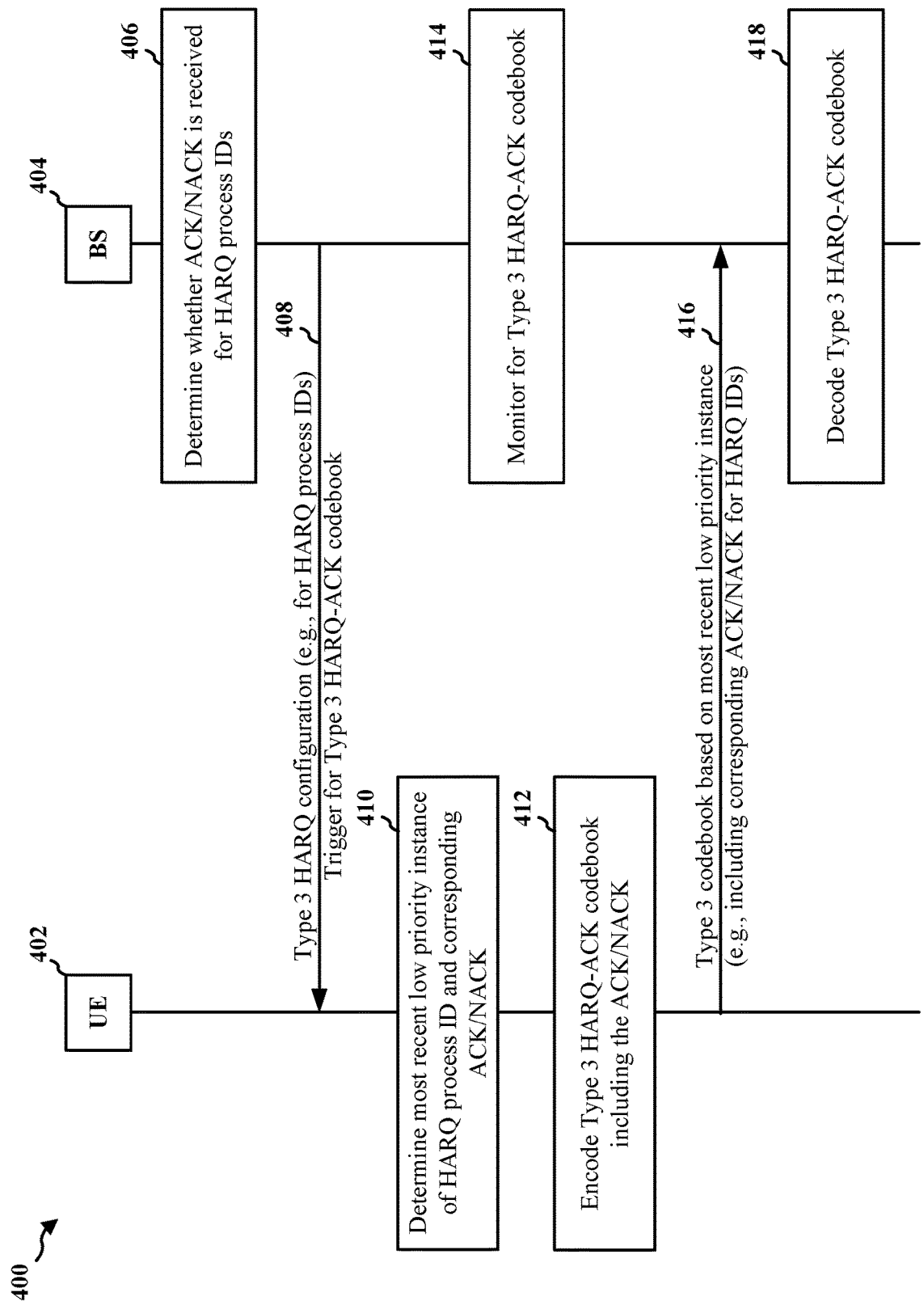
FIG. 4 is a call flow diagram illustrating communications between a UE and a base station.

FIG. 4 is a call flow diagram 400 illustrating communications between a UE 402 and a base station 404. At 406, the base station 404 may determine whether an ACK/NACK is received for one or more HARQ process IDs. If the ACK/NACK is not received, e.g., because the UE 402 dropped the transmission that was to include the ACK/NACK, the base station 404 may transmit, at 408, a configuration for a Type 3 HARQ-ACK codebook. The Type 3 HARQ-ACK codebook may be indicative of a most recent low priority instance of the HARQ process IDs. The transmission, at 408, may include a trigger for the Type 3 HARQ-ACK codebook.

After receiving the trigger, at 408, the UE 402 may determine, at 410, a most recent low priority instance of a HARQ process ID and corresponding ACK/NACK for the most recent low priority instance of the HARQ process ID. The UE 402 may encode, at 412, the Type 3 HARQ-ACK codebook including the ACK/NACK determined based on the most recent low priority instance of the HARQ process ID. At 416, the UE 402 may report the Type 3 HARQ-ACK codebook including the ACK/NACK for the most recent low priority instance of the HARQ process ID. The Type 3 HARQ-ACK codebook may be based on the determined most recent low priority instance of the HARQ process ID.

At 414, the base station 404 may monitor for the Type 3 HARQ-ACK codebook reported by the UE 402 and, at 416, the base station 404 may receive the reported Type 3 HARQ-ACK codebook. At 418, the base station 404 may decode the Type 3 HARQ-ACK codebook including the ACK/NACK for the most recent low priority instance of the HARQ process ID. Accordingly, the base station 404 may determine whether the most recent low priority instance of the HARQ process ID corresponds to an ACK or a NACK.

Figure 5:
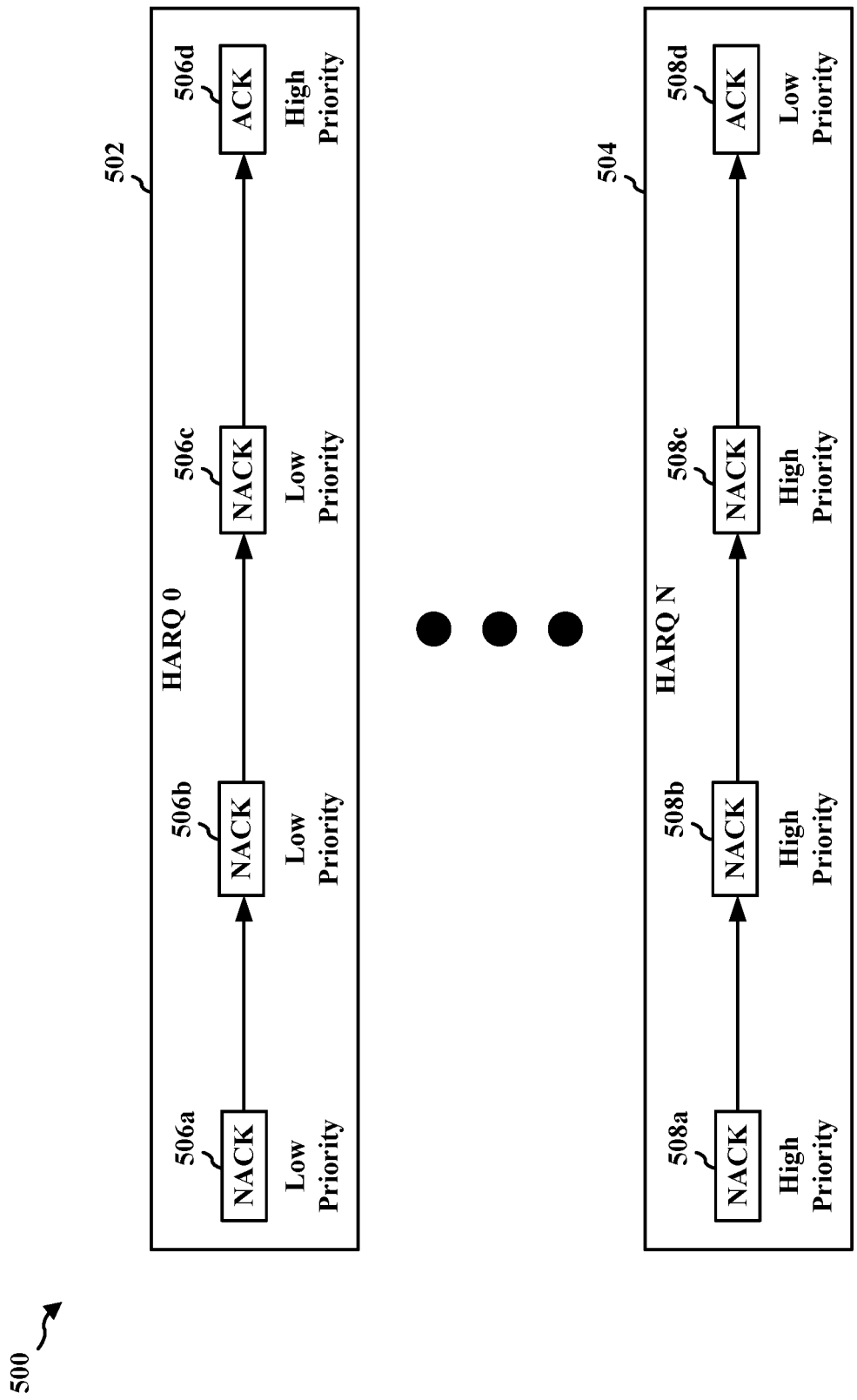
FIG. 5 illustrates a diagram including high priority and low priority acknowledgment/negative-acknowledgments (ACK/NACKs) for HARQ process identifiers (IDs).

FIG. 5 illustrates a diagram 500 including high priority and low priority ACK/NACKs 506a-508d for HARQ process IDs 502-504. A HARQ process may be associated with three HARQ process Types. Type 1 may be based on chase combining, where each retransmission by the base station 404 may include the same information (e.g., data and parity bits). Type 2 and Type 3 may be based on incremental redundancy, where each retransmission by the base station 404 may include different information than a previous transmission. In a Type 2 HARQ process, redundancy may be added on each retransmission such that the UE 402 may decode each of the retransmissions to obtain a packet. In a Type 3 HARQ process, the UE 402 may use each retransmission to decode the data such that a retransmission may be performed if channel conditions previously caused the data to be improperly decoded by the UE 402.

In licensed channels, the UE 402 may transmit an ACK/NACK (e.g., 506a, 506b, 506c, 506d, 508a, 508b, 508c, 508d) whenever the base station 404 schedules the UE 402 to transmit the ACK/NACK (e.g., 506a-508d). In unlicensed channels, however, beam failure may cause one or more ACK/NACKs (e.g., 506a-508d) to not be transmitted by the UE 402. For example, the scheduled channel may be in use by another network entity and may not be used by the UE 402 for transmitting the one or more scheduled ACK/NACKs (e.g., 506a-508d). Thus, the UE 402 may drop the transmission of the one or more ACK/NACKs (e.g., 506a-508d) and the base station 404 may retransmit a PDSCH to provide the UE 402 with a second decoding opportunity for sending the ACK/NACKs (e.g., 506a-508d).

The base station 404 may trigger the UE 402 to transmit a Type 3 codebook for reporting the ACK/NACK for all of the configured HARQ processes 502-504 in one transmission. A bit flag in DCI, e.g., DCI 1_1, may be used to trigger the full HARQ ACK/NACK report for the HARQ processes 502-504 and component carriers (CCs). For example, if 16 downlink HARQ processes are configured in the downlink for 1 CC, the base station 404 may set the bit flag to 1 in DCI 1_1 and, instead of reporting the ACK/NACKs for the corresponding PDSCH, the UE 402 may report 16 bits of HARQ-ACK together in one transmission to the base station 404. If the UE 402 fails to transmit one of the ACK/NACKs, the base station 404 may set the bit to 1 in a later downlink grant for the UE 402 to report all the HARQ-ACK bits. Such techniques may improve the reliability of ACK/NACK transmission by providing the UE 402 a second opportunity to transmit the ACK/NACKs, if the base station 404 misses a previous transmission. For instance, a configuration from the base station 404 may be provided for the UE 402 to transmit 8 ACK/NACKs, but because of beam failure or other errors the UE 402 may not have received the configuration and the ACK/NACK may not be transmitted.

A new data indicator (NDI) for a corresponding HARQ process (e.g., 502-504) may be configured for reporting along with an RRC flag. Thus, instead of transmitting 16 bits, for example, the UE 402 may transmit 32 bits. That is, when a grant is received, the UE 402 may send either an ACK or a NACK for the HARQ process (e.g., 502-504) as well as a flag corresponding to the ACK/NACK bits to provide robustness in case a DCI transmission is missed by the UE 402. In examples, if a HARQ process ID 502 indicated as HARQ 0 is received with a NDI ID of NDI 0, the UE 402 may transmit an ACK based on a first transmission opportunity. In accordance with a NDI toggling procedure, the base station 404 may subsequently transmit a second DCI with the same HARQ ID (e.g., HARQ 0) but with a different NDI ID (e.g., NDI 1). However, if the second DCI is missed by the UE 402, the UE 402 may receive no indication that HARQ 0 with NDI 1 was transmitted by the base station 404 and the second DCI may not be decoded by the UE 402.

For Type 3 codebook reporting/base station-triggered full HARQ-ACK reports where the UE 402 receives the first DCI (e.g., having NDI 0) but misses the second DCI (e.g., having NDI 1), the UE 402 may report an ACK for HARQ 0 for the first DCI, but the base station 404 may associate the reported ACK with the PDSCH corresponding to the second DCI. Thus, an ACK/NACK error may occur and the base station 404 may not perform retransmission of the data for the transport block (TB), as the base station 404 may assume the second DCI was received and that there is missing information in the data flow that may be determined. While sending NDI may improve reliability by allowing a missing downlink grant to be detected, the NDI may double the HARQ codebook size based on having both ACK/NACK bits and NDI bits for each HARQ process (e.g., 502-504). In examples, the base station 404 may configure the UE 402 to determine whether to send NDI with the Type 3 codebook. If NDI is not configured to be reported, one or more ACK/NACK errors may occur. In some cases, the base station 404 may accept the risk of ACK/NACK errors in exchange for having a smaller payload size.

URLLC may be associated with different priorities for ACK/NACK reporting/transmission. For example, 1 bit may be included in the DCI/downlink grant for the PDSCH that indicates whether the ACK/NACK corresponding to the PDSCH is high priority or low priority. Low priority ACK/NACK may be used for eMBB procedures and high priority ACK/NACK may be used for URLLC procedures. If the PDSCH is high priority, the ACK/NACK corresponding to the PDSCH may be reported to the base station 404 with higher priority. The HARQ process IDs 502-504 may be shared for both low priority transmissions and high priority transmissions. For example, 16 HARQ processes may include some low priority transmissions and some high priority transmissions. The priority level associated with ACK/NACK reporting may be controlled by the base station 404.

If a high priority HARQ-ACK codebook and a low priority HARQ-ACK codebook collide, the low priority HARQ-ACK codebook may be dropped by the UE 402, such that the UE 402 may transmit the high priority HARQ-ACK codebook. For instance, the high priority HARQ-ACK may be for URLLC, which may not be missed by the base station 404. Multiplexing the high priority HARQ-ACK and the low priority HARQ-ACK may cause a size of the codebook to be increased. Further, such multiplexing may reduce a reliability of high priority HARQ-ACK codebook reception (e.g., based on the increased payload size).

In some examples, a dropped low priority HARQ-ACK codebook may not be retransmitted. In order to recover dropped ACK/NACKs, the base station 404 may retransmit the PDSCH to provide the UE 402 with another encoding opportunity. Since the UE 402 may have already decoded the data once, there may be inefficiencies in having the UE 402 decode the data for a second time. Retransmitting the PDSCH may also cause resource waste. As a result, some degree of low priority/high priority HARQ-ACK codebook multiplexing may be performed, such as bundling one or more low priority HARQ-ACK bits and associating the bundle of bits with the high priority HARQ-ACK codebook to limit the codebook size while also maintaining a threshold level of quality.

When the UE 402 transmits the high priority HARQ-ACK, one or more of the low priority HARQ-ACK bits may be appended to the transmission. For example, if there are 10 bits for a low priority ACK/NACK, 1 bit may be reported based on available space for reporting. Based on bundling techniques, if all of the 10 HARQ processes are associated with an ACK, the UE 402 may append a low priority ACK to the high priority codebook. However, if even one of the HARQ processes is associated with a NACK, the UE 402 may append a NACK to the high priority codebook. If the UE 402 appends a NACK that corresponds to the bundled bits, the base station 404 may not determine which of the 10 HARQ processes is associated with the NACK, as one or more of the 10 HARQ processes may be associated with NACKs.

Even if an ACK is appended to the high priority codebook, the UE 402 and the base station 404 may miscommunicate regarding a number of granted PDSCHs to be multiplexed, based on a wraparound operation of the NDI and/or missing grants in the last slot. In examples where the data is bundled into one ACK bit, the base station 404 may, e.g., grant 4 PDSCHs/4 carriers in slot 0, another 4 PDSCHs/4 carriers in slot 1, and request the UE 402 to report an ACK/NACK in slot 3. If the grant for slot 1 is missing, all the data corresponding to slot 1 may be missing and the UE 402 may determine that there are 4 grants, instead of 8 grants. Thus, the UE 402 may determine the ACK/NACK based on the 4 grants/4 PDSCHs, even though the base station 404 may assume the ACK/NACK received by the UE 402 is based on all 8 grants/8 PDSCHs. If the PDSCHs are properly decoded in the first slot, an ACK may be determined, but if there is interference in the second slot, the PDCCHs may be missing and the UE 402 may receive no indication of the latter 4 PDSCHs. Based on the bundling operation, the UE 402 may transmit 1 bit for an ACK to the base station 404, which may interpret the ACK as being applied to all 8 PDSCHs.

If Type 3 codebooks are utilized together with low priority/high priority HARQ-ACK, the combination may be used for URLLC procedures. For URLLC, the low priority HARQ-ACK codebooks may be dropped and, in a next transmission, the base station 404 may trigger the UE 402 to transmit the full ACK/NACK codebook. When a codebook is dropped or bundled, the Type 3 codebook may trigger retransmission of all the HARQ process ACK/NACKs 506a-508d for the base station 404 to determine whether each of the HARQ processes 502-504 corresponds to an ACK or a NACK. Thus, a second opportunity may be provided for the UE 402 to report all the ACK/NACKs associated with the dropped PDSCH and reduce missing information. For low priority eMBB cases, delay caused by retransmission may not cause the QoS to be reduced below a threshold, but may allow the base station 404 to receive previously dropped ACK/NACK information.

High priority ACK/NACKs associated with URLLC licensed bands may not be dropped, as such ACK/NACKs are prioritized. However, low priority ACK/NACKs as well as bundled ACK/NACKs may be dropped, which may result in compression of information for low priority ACK/NACKs to provide a smaller payload. In Type 3, a most recent instance of HARQ-ACK (e.g., 506d/508d) for a particular HARQ process (e.g., 502 or 504) may be reported. Based on the aforementioned example, if the UE 402 receives the HARQ 0 with NDI 0 but does not receive the HARQ 0 with NDI 1, the UE 402 may report an ACK/NACK for the HARQ 0 with NDI 0. However, if the UE 402 receives the HARQ 0 with NDI 1, the UE 402 may report an ACK/NACK for the HARQ ID 0 with NDI 1.

Given the higher priority associated with URLLC configurations, the UE 402 may not drop one or more ACK/NACKs. Thus, reporting the most recent instance of ACK/NACK 506d in high priority cases, such as for URLLC, may be a waste of resources since the ACK/NACK 506d may not be dropped and may have been already reported by the UE 402. Further, even if the high priority HARQ process ID 502 initially corresponded to a low priority transmission (e.g., 506a-506c) but is subsequently used for a high priority transmission (e.g., 506d) and reported by the UE 402, there may be no need to report the latest instance of the HARQ process ID 502, as the subsequent high priority HARQ-ACK (e.g., 506d) may also not be dropped and may have been already reported by the UE 402. However, if the HARQ process ID 504 initially corresponds to a high priority transmission (e.g., 508a-508c) and is subsequently used for a low priority transmission (e.g., 508d), there may be a need to report the most recent instance of the HARQ process ID 504, as the low priority transmission (e.g., most recent instance of the HARQ process ID 504) may not have been reported by the UE 402.

For the Type 3 codebook, instead of reporting the most recent instance of a HARQ process ID 502-504 for ACK/NACKs 506a-508d, a low priority mode may be implemented for which the UE 402 may report for each HARQ process ID 502-504 a most recent instance of ACK/NACK corresponding to a transmission in which the HARQ process ID 502-504 was transmitted with low priority (e.g., 506c and 508d). For example, if HARQ process X corresponds to a low priority transmission in slot N and is later associated with a high priority transmission in slot M, where M>N, the ACK/NACK for HARQ process X in slot N may be retransmitted when the Type 3 codebook is triggered, for example, at slot M+5. Thus, the ACK/NACK for HARQ process X in slot M may not be retransmitted, as it otherwise may have been without the low priority mode being activated. Instead, the ACK/NACK for the HARQ process X in the earlier slot N may be retransmitted.

If the HARQ process X does not include a low priority transmission (e.g., the HARQ process X is associated with all high priority transmissions), a NACK may be reported by the UE 402. In aspects, an initialization condition for the HARQ bit may correspond to a NACK (e.g., until a low priority instance occurs). In further aspects, a reporting mechanism for the low priority mode may be limited to instances where NDI reporting in the Type 3 codebook is not configured. If NDI reporting is configured, the low priority mode may still be used but less retransmissions may be reported, as there may be no ACK/NACK errors among the base station 404 and the UE 402 since the base station 404 may determine the HARQ-ACK being retransmitted by the UE 402 based on the NDI.

The base station 404 may configure a set of HARQ process IDs to be included in the report, such as the HARQ process ID 502, that the base station 404 may use for low priority traffic. That is, rather than reporting all the configured HARQ process IDs 502-504, the low priority mode may allow the UE 402 to report the low priority HARQ process IDs (e.g., 502) since base station 404 may determine that such HARQ process IDs that are always designated as high priority and may correspond to a NACK. Thus, the base station 404 may configure the UE 402 to report the HARQ process IDs that may be used for low priority to reduce the number of reported bits.

The low priority mode for the Type 3 codebook may be RRC configured. In examples, an RRC parameter may modify certain Type 3 codebook operations, such as the HARQ-ACK instances that are to be retransmitted. The DCI bits may trigger the UE 402 to report the Type 3 codebook based on the modified Type 3 operations for the low priority mode. The modified Type 3 codebook may be reported together with the unmodified Type 3 codebook (e.g., by adding two bits to trigger both Type 3 codebooks, instead of adding one bit to trigger just the modified Type 3 codebook). The one or two triggering bits in the DCI may be configured to trigger any combination of the three Type 3 codebook configurations, which may include: Type 3 codebook not being triggered, unmodified Type 3 codebook being triggered, and/or modified Type 3 codebook being triggered. Type 3 triggering may be based on adding one bit to a Type 1 trigger or a Type 2 trigger. If 0 bits are added, Type 1 or Type 2 may be transmitted. If 1 bit is added, one of the Type 3 configurations may be transmitted. If 2 bits are added, both the modified Type 3 and unmodified Type 3 configurations may be transmitted.

For at least instances of HARQ-ACK retransmission, the modified Type 3 HARQ-ACK codebook may be communicated between the UE and the base station with a decreased payload size in comparison to a payload size of an unmodified Type 3 HARQ-ACK codebooks. The modified Type 3 HARQ-ACK codebook may also be referred to as an enhanced Type 3 codebook. A codebook size of a single triggered modified/enhanced Type 3 HARQ-ACK codebook may be at least determined based on an RRC configuration.

Codebook construction may be based on HARQ processes, such as being ordered in accordance with HARQ process IDs and serving cells. Some configurations may include one-shot triggering (e.g., via downlink assignment) of a HARQ-ACK retransmission on a PUCCH resource, e.g., other than an enhanced Type 2 or Type 3 HARQ-ACK codebook. Enhanced Type 3 HARQ-ACK codebook and/or one-shot triggering (e.g., via downlink assignment) of HARQ-ACK retransmission on a PUCCH resource other than the enhanced Type 2 or Type 3 HARQ-ACK codebook may be based on one or more UE capabilities.

The enhanced/modified Type 3 HARQ-ACK codebook may be used for URLLC. One or more bits of DCI may be used to trigger generation and reporting of the enhanced/modified Type 3 HARQ-ACK codebook from the UE to the base station. For example, rather than reporting an entire codebook based on unmodified Type 3 HARQ-ACK techniques, the UE may report a smaller (e.g., modified) Type 3 HARQ-ACK codebook that includes a subset of HARQ process IDs included in a larger set of HARQ process IDs associated with full Type 3 HARQ-ACK reporting. Accordingly, a size of the modified Type 3 HARQ-ACK codebook may be reduced based on reporting a subset ACK/NACKs in the codebook.

The unmodified Type 3 HARQ-ACK codebook may be triggered based on a different triggering bit in the DCI than the modified Type 3 HARQ-ACK codebook. The UE may report the ACK/NACK for a set or subset of HARQ process IDs based on the triggering bit. The set/subset of HARQ process IDs may be RRC configured. For example, the base station may configure the set/subset of HARQ processes in association with certain CCs, such that when the triggering bit is received by the UE via DCI, the UE may report ACK/NACK for the certain CCs/HARQ processes. The codebook size of the enhanced/modified Type 3 HARQ-ACK codebook may be at least indicated via the RRC configuration. Accordingly, RRC signaling may be used to configure the set/subset of HARQ processes to be included in the modified Type 3 HARQ-ACK codebook reported to the base station.

Figure 6:
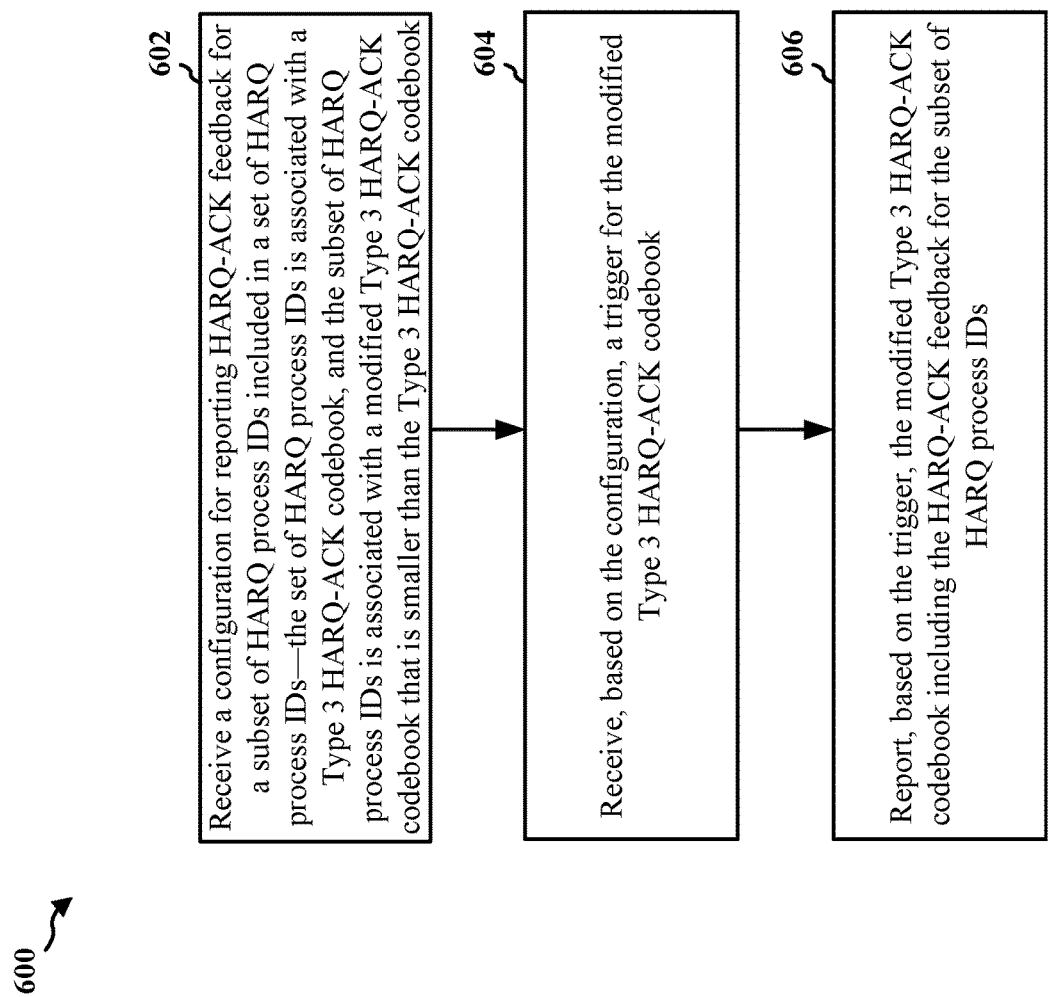
FIG. 6 is a flowchart of a method of wireless communication at a UE.

FIG. 6 is a flowchart 600 of a method of wireless communication. The method may be performed by a UE (e.g., the UE 104/402, the apparatus 1302, etc.), which may include the memory 360 and which may be the entire UE 104/402 or a component of the UE 104/402, such as the TX processor 368, the RX processor 356, and/or the controller/processor 359.

At 602, the UE may receive a configuration for reporting HARQ-ACK feedback for a subset of HARQ process IDs included in a set of HARQ process IDs—the set of HARQ process IDs is associated with a Type 3 HARQ-ACK codebook, and the subset of HARQ process IDs is associated with a modified Type 3 HARQ-ACK codebook that is smaller than the Type 3 HARQ-ACK codebook. For example, referring to FIG. 4, the UE 402 may receive, at 408, a Type 3 HARQ configuration (e.g., for HARQ process IDs). The reception, at 602, may be performed by the reception component 1330 of the apparatus 1302 in FIG. 13.

At 604, the UE may receive, based on the configuration, a trigger for the modified Type 3 HARQ-ACK codebook. For example, referring to FIG. 4, the UE 402 may receive, at 408, a trigger for the Type 3 HARQ-ACK codebook in association with the Type 3 HARQ configuration. The reception, at 604, may be performed by the reception component 1330 of the apparatus 1302 in FIG. 13.

At 606, the UE may report, based on the trigger, the modified Type 3 HARQ-ACK codebook including the HARQ-ACK feedback for the subset of HARQ process IDs. For example, referring to FIG. 4, the UE 402 may report, at 416, the Type 3 codebook to the base station 404 (e.g., including corresponding ACK/NACK for HARQ IDs). The reporting, at 606, may be performed by the reporter component 1344 of the apparatus 1302 in FIG. 13.

Figure 7:
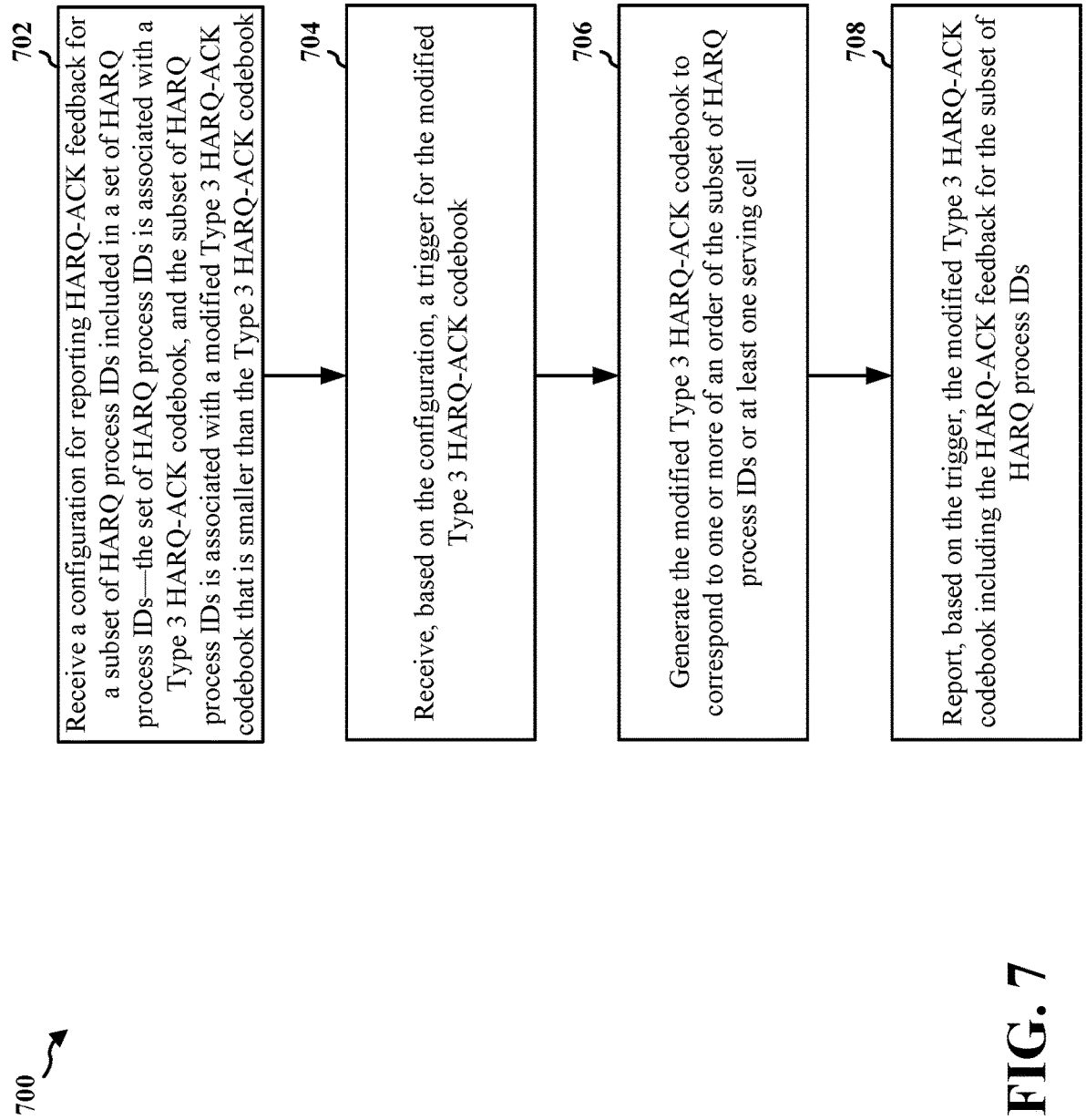
FIG. 7 is a flowchart of a method of wireless communication at a UE.

FIG. 7 is a flowchart 700 of a method of wireless communication. The method may be performed by a UE (e.g., the UE 104/402, the apparatus 1302, etc.), which may include the memory 360 and which may be the entire UE 104/402 or a component of the UE 104/402, such as the TX processor 368, the RX processor 356, and/or the controller/processor 359.

At 702, the UE may receive a configuration for reporting HARQ-ACK feedback for a subset of HARQ process IDs included in a set of HARQ process IDs—the set of HARQ process IDs is associated with a Type 3 HARQ-ACK codebook, and the subset of HARQ process IDs is associated with a modified Type 3 HARQ-ACK codebook that is smaller than the Type 3 HARQ-ACK codebook. For example, referring to FIG. 4, the UE 402 may receive, at 408, a Type 3 HARQ configuration (e.g., for HARQ process IDs). The configuration received, at 408, for the HARQ-ACK feedback for the subset of HARQ process IDs may correspond to an RRC configuration. A size of the modified Type 3 HARQ-ACK codebook may also be indicated, at 408, via the RRC configuration. The reception, at 702, may be performed by the reception component 1330 of the apparatus 1302 in FIG. 13.

At 704, the UE may receive, based on the configuration, a trigger for the modified Type 3 HARQ-ACK codebook. For example, referring to FIG. 4, the UE 402 may receive, at 408, a trigger for the Type 3 HARQ-ACK codebook in association with the Type 3 HARQ configuration. The trigger (e.g., received at 408) may be a one-shot trigger for a HARQ-ACK retransmission on a PUCCH resource. The trigger (e.g., received at 408) for the modified Type 3

HARQ-ACK codebook may be based on a first DCI bit that is different from a second DCI bit associated with a second trigger for the Type 3 HARQ-ACK codebook. The reception, at 704, may be performed by the reception component 1330 of the apparatus 1302 in FIG. 13.

At 706, the UE may generate the modified Type 3 HARQ-ACK codebook to correspond to one or more of an order of the subset of HARQ process IDs or at least one serving cell. For example, referring to FIG. 4, the UE 402 may encode, at 412, the Type 3 HARQ-ACK codebook including the ACK/NACK based on the trigger and/or configuration received, at 408, from the base station 404. The generation, at 706, may be performed by the generation component 1346 of the apparatus 1302 in FIG. 13.

At 708, the UE may report, based on the trigger, the modified Type 3 HARQ-ACK codebook including the HARQ-ACK feedback for the subset of HARQ process IDs. For example, referring to FIG. 4, the UE 402 may report, at 416, the Type 3 codebook to the base station 404 (e.g., including corresponding ACK/NACK for HARQ IDs). The one-shot trigger may be received, at 408, via a downlink assignment, and the reporting, at 416, of the modified Type 3 HARQ-ACK codebook based on the one-shot trigger may be further based on a UE capability of the UE 402. The reporting, at 416, of the modified Type 3 HARQ-ACK codebook including the HARQ-ACK feedback for the subset of HARQ process IDs may also be based on a UE capability of the UE 402. The reporting, at 708, may be performed by the reporter component 1344 of the apparatus 1302 in FIG. 13.

Figure 8:
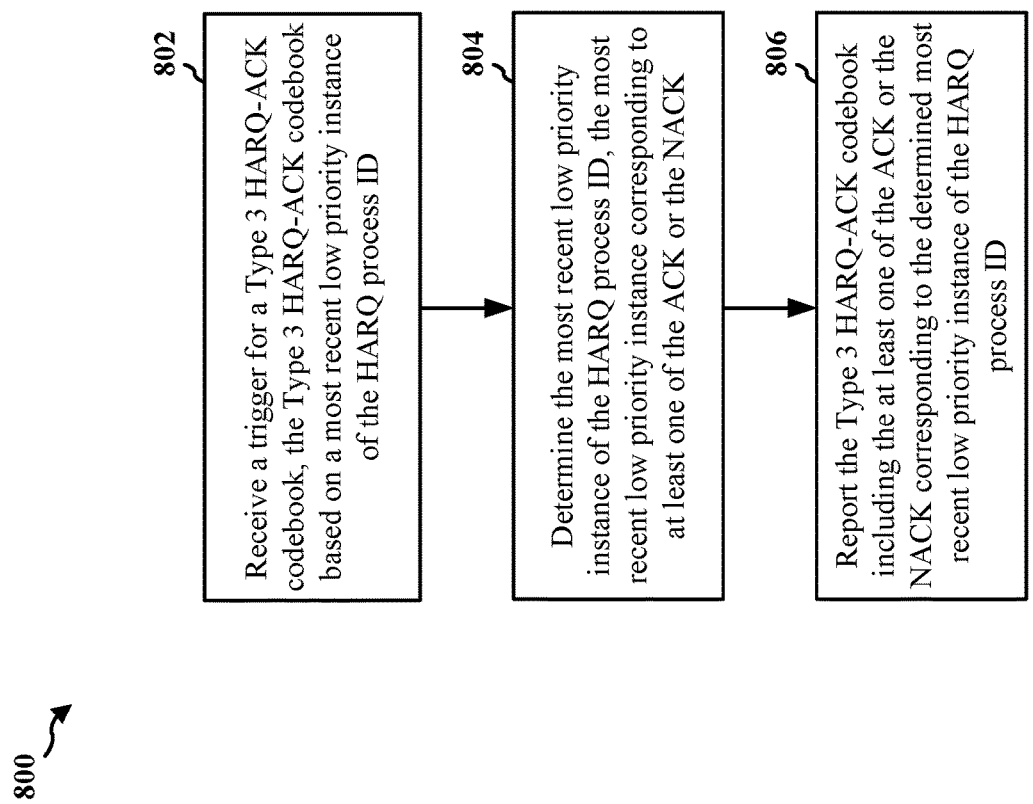
FIG. 8 is a flowchart of a method of wireless communication at a UE.

FIG. 8 is a flowchart 800 of a method of wireless communication. The method may be performed by a UE (e.g., the UE 104/402, the apparatus 1302, etc.), which may include the memory 360 and which may be the entire UE 104/402 or a component of the UE 104/402, such as the TX processor 368, the RX processor 356, and/or the controller/ processor 359.

At 802, the UE may receive a trigger for a Type 3 HARQ-ACK codebook, the Type 3 HARQ-ACK codebook based on a most recent low priority instance of the HARQ process ID. For example, referring to FIGS. 4-5, the UE 402 may receive, at 408, a trigger for a Type 3 HARQ-ACK codebook. The Type 3 HARQ-ACK codebook may be based on a most recent low priority instance (e.g., 506c/508d) of the HARQ process IDs 502/504. The trigger for the Type 3 HARQ-ACK codebook may be received, at 408, in DCI. In examples, the trigger received, at 408, may be based on a number of bits configured to at least one of trigger the Type 3 HARQ-ACK codebook based on the most recent low priority instance (e.g., 506c/508d) of the HARQ process ID 502/504, trigger a Type 3 HARQ-ACK codebook based on a most recent instance (e.g., 506d/508d) of the HARQ process ID 502/504, or not trigger one or more of the Type 3 HARQ-ACK codebooks. The reception, at 802, may be performed by the reception component 1330 of the apparatus 1302 in FIG. 13.

At 804, the UE may determine the most recent low priority instance of the HARQ process ID, the most recent low priority instance corresponding to at least one of the ACK or the NACK. For example, referring to FIGS. 4-5, the UE 402 may determine, at 410, the most recent low priority instance of a HARQ process ID and corresponding ACK/ NACK. For instance, the UE 402 may determine that the most recent low priority instance for HARQ 0 corresponds to a NACK, at 506c, and/or that the most recent low priority instance for HARQ N corresponds to an ACK, at 508d. That is, the most recent low priority instance 506c of the HARQ process ID 502 may occur prior to a high priority instance 506d of the HARQ process ID 502. The determination, at 804, may be performed by the determination component 1340 of the apparatus 1302 in FIG. 13.

At 806, the UE may report the Type 3 HARQ-ACK codebook including the at least one of the ACK or the NACK corresponding to the determined most recent low priority instance of the HARQ process ID. For example, referring to FIG. 4, the UE 402 may report, at 416, the Type 3 codebook based on the most recent low priority instance and include a corresponding ACK/NACK for the HARQ ID. The Type 3 HARQ-ACK codebook including the at least one of the ACK or the NACK may be reported, at 416, if a NDI is not configured with the HARQ process ID. Further, the Type 3 HARQ-ACK codebook including the at least one of the ACK or the NACK may be reported, at 416, with a second Type 3 HARQ-ACK codebook based on a most recent (e.g., high priority or low priority) instance of the HARQ process ID. The reporting, at 806, may be performed by the reporter component 1344 of the apparatus 1302 in FIG. 13.

Figure 9:
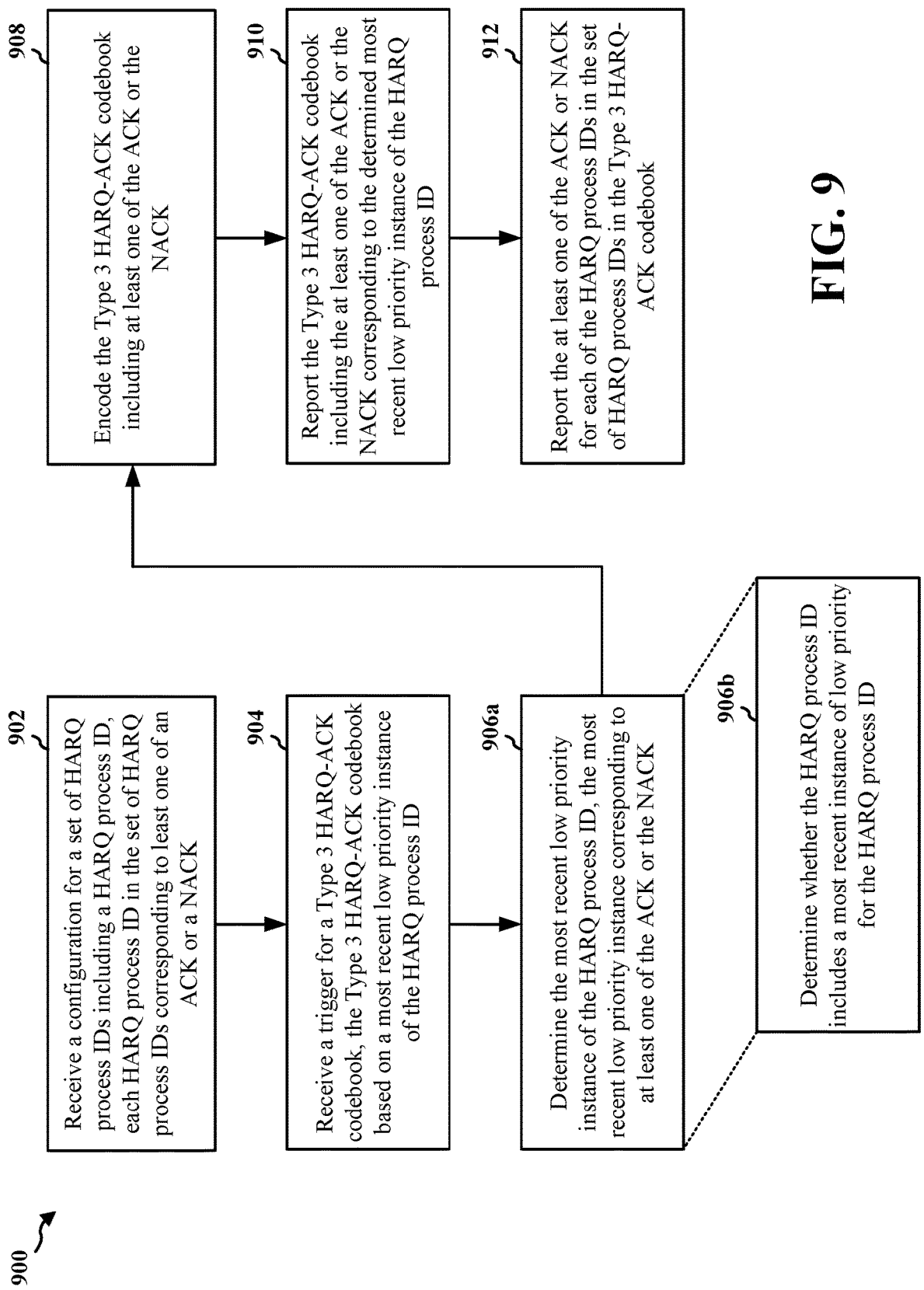
FIG. 9 is a flowchart of a method of wireless communication at a UE.

FIG. 9 is a flowchart 900 of a method of wireless communication. The method may be performed by a UE (e.g., the UE 104/402, the apparatus 1302, etc.), which may include the memory 360 and which may be the entire UE 104/402 or a component of the UE 104/402, such as the TX processor 368, the RX processor 356, and/or the controller/ processor 359.

At 902, the UE may receive a configuration for a set of HARQ process IDs including a HARQ process ID, each HARQ process ID in the set of HARQ process IDs corresponding to at least one of an ACK or a NACK. For example, referring to FIGS. 4-5, the UE 402 may receive, at 408, a Type 3 HARQ configuration for HARQ process IDs, such as the HARQ process IDs 502-504. The Type 3 HARQ-ACK codebook (e.g., 502-504) including the at least one of the ACK or the NACK (e.g., 506a-508d) may be configured based on a RRC configuration. The reception, at 902, may be performed by the reception component 1330 of the apparatus 1302 in FIG. 13.

At 904, the UE may receive a trigger for a Type 3 HARQ-ACK codebook, the Type 3 HARQ-ACK codebook based on a most recent low priority instance of the HARQ process ID. For example, referring to FIGS. 4-5, the UE 402 may receive, at 408, a trigger for a Type 3 HARQ-ACK codebook. The Type 3 HARQ-ACK codebook may be based on a most recent low priority instance (e.g., 506c/508d) of the HARQ process IDs 502/504. The trigger for the Type 3 HARQ-ACK codebook may be received, at 408, in DCI. In examples, the trigger received, at 408, may be based on a number of bits configured to at least one of trigger the Type 3 HARQ-ACK codebook based on the most recent low priority instance (e.g., 506c/508d) of the HARQ process ID 502/504, trigger a Type 3 HARQ-ACK codebook based on a most recent instance (e.g., 506d/508d) of the HARQ process ID 502/504, or not trigger one or more of the Type 3 HARQ-ACK codebooks. The reception, at 904, may be performed by the reception component 1330 of the apparatus 1302 in FIG. 13.

At 906a, the UE may determine the most recent low priority instance of the HARQ process ID, the most recent low priority instance corresponding to at least one of the ACK or the NACK. For example, referring to FIGS. 4-5, the UE 402 may determine, at 410, the most recent low priority instance of a HARQ process ID and corresponding ACK/ NACK. For instance, the UE 402 may determine that the most recent low priority instance for HARQ 0 corresponds to a NACK, at 506c, and/or that the most recent low priority instance for HARQ N corresponds to an ACK, at 508d. That is, the most recent low priority instance 506c of the HARQ process ID 502 may occur prior to a high priority instance 506d of the HARQ process ID 502. The determination, at 906a, may be performed by the determination component 1340 of the apparatus 1302 in FIG. 13.

At 906b, to determine the most recent low priority instance of the HARQ process ID, the UE may determine whether the HARQ process ID includes a most recent instance of low priority for the HARQ process ID. For example, referring to FIG. 4, the determination, at 410, may include a further determination that the HARQ process ID has never included a low priority instance (e.g., the HARQ process ID may be associated with high priority instances since initialization). In aspects, an initialization condition of the HARQ process ID may correspond to a NACK. The NACK may be reported by the UE 402 in the Type 3 HARQ-ACK codebook when the HARQ process ID does not include the most recent instance of low priority for the HARQ process ID. The determination, at 906b, may be performed by the determination component 1340 of the apparatus 1302 in FIG. 13.

At 908, the UE may encode the Type 3 HARQ-ACK codebook including at least one of the ACK or the NACK. For example, referring to FIG. 4, the UE 402 may encode, at 412, the Type 3 HARQ-ACK codebook including the ACK/NACK. The encoding, at 908, may be performed by the encoder component 1342 of the apparatus 1302 in FIG. 13.

At 910, the UE may report the Type 3 HARQ-ACK codebook including the at least one of the ACK or the NACK corresponding to the determined most recent low priority instance of the HARQ process ID. For example, referring to FIG. 4, the UE 402 may report, at 416, the Type 3 codebook based on the most recent low priority instance and include a corresponding ACK/NACK for the HARQ ID. The Type 3 HARQ-ACK codebook including the at least one of the ACK or the NACK may be reported, at 416, if a NDI is not configured with the HARQ process ID. Further, the Type 3 HARQ-ACK codebook including the at least one of the ACK or the NACK may be reported, at 416, with a second Type 3 HARQ-ACK codebook based on a most recent (e.g., high priority or low priority) instance of the HARQ process ID. The reporting, at 910, may be performed by the reporter component 1344 of the apparatus 1302 in FIG. 13.

At 912, the UE may report the at least one of the ACK or NACK for each of the HARQ process IDs in the set of HARQ process IDs in the Type 3 HARQ-ACK codebook. For example, referring to FIG. 4, the UE 402 may report, at 416, a corresponding ACK/NACK for one or more HARQ IDs in the Type 3 codebook. The reporting, at 912, may be performed by the reporter component 1344 of the apparatus 1302 in FIG. 13.

Figure 10:
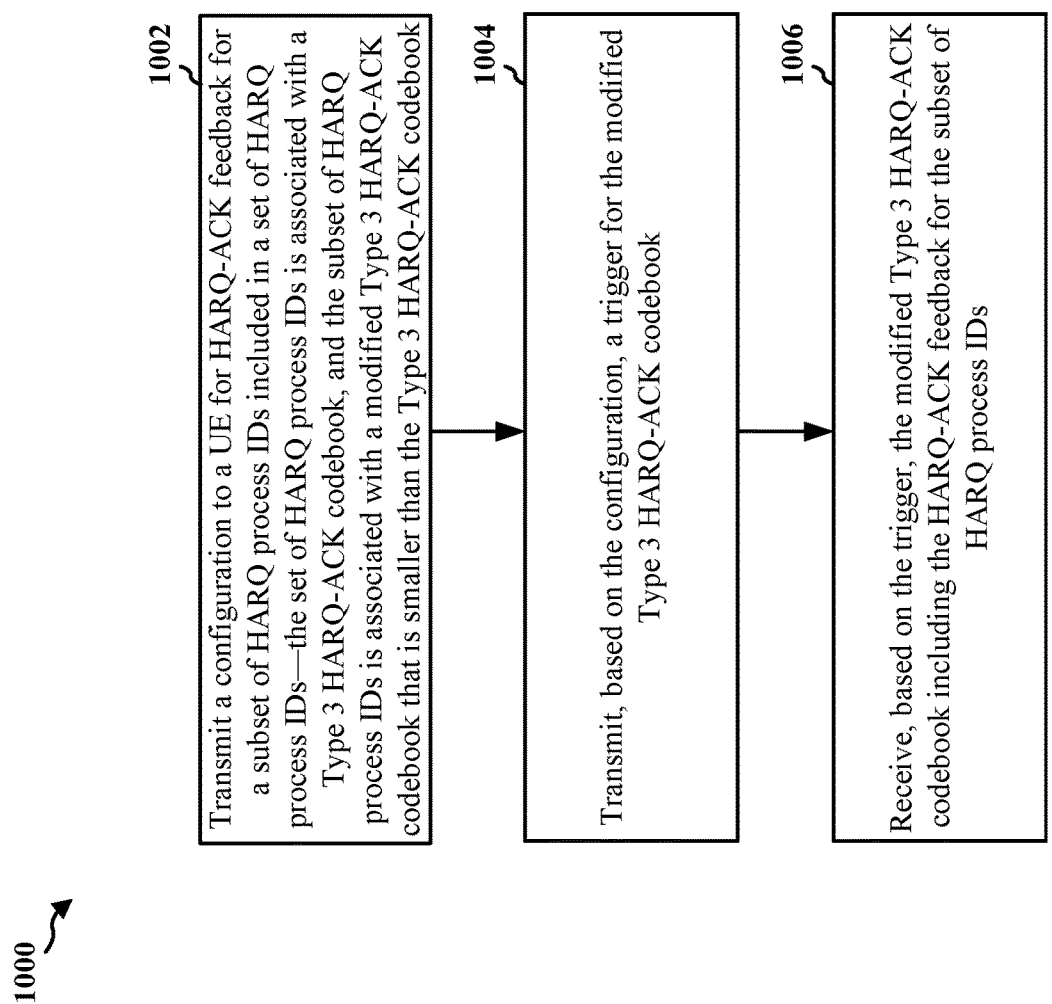
FIG. 10 is a flowchart of a method of wireless communication at a base station.

FIG. 10 is a flowchart 1000 of a method of wireless communication. The method may be performed by a base station (e.g., the base station 102/404, the apparatus 1402, etc.), which may include the memory 376 and which may be the entire base station 102/404 or a component of the base station 102/404, such as the TX processor 316, the RX processor 370, and/or the controller/processor 375.

At 1002, the base station may transmit a configuration to a UE for HARQ-ACK feedback for a subset of HARQ process IDs included in a set of HARQ process IDs—the set of HARQ process IDs is associated with a Type 3 HARQ-ACK codebook, and the subset of HARQ process IDs is associated with a modified Type 3 HARQ-ACK codebook that is smaller than the Type 3 HARQ-ACK codebook. For example, referring to FIG. 4, the base station may transmit, at 408, a Type 3 HARQ configuration (e.g., for HARQ process IDs) to a UE 402. The transmission, at 1002, may be performed by the transmission component 1434 of the apparatus 1402 in FIG. 14. The configuration transmitted, at 408, for the HARQ-ACK feedback for the subset of HARQ process IDs may correspond to an RRC configuration. A size of the modified Type 3 HARQ-ACK codebook may also be indicated, at 408, via the RRC configuration. The modified Type 3 HARQ-ACK codebook (e.g., encoded at 412) may correspond to one or more of an order of the subset of HARQ process IDs or at least one serving cell.

At 1004, the base station may transmit, based on the configuration, a trigger for the modified Type 3 HARQ-ACK codebook. For example, referring to FIG. 4, the base station may transmit, at 408, a trigger for the Type 3 HARQ-ACK codebook in association with the Type 3 HARQ configuration. The trigger (e.g., transmitted at 408) may be a one-shot trigger for a HARQ-ACK retransmission on a PUCCH resource. The trigger (e.g., transmitted at 408) for the modified Type 3 HARQ-ACK codebook may be based on a first DCI bit that is different from a second DCI bit associated with a second trigger for the Type 3 HARQ-ACK codebook. The transmission, at 1004, may be performed by the transmission component 1434 of the apparatus 1402 in FIG. 14.

At 1006, the base station may receive, based on the trigger, the modified Type 3 HARQ-ACK codebook including the HARQ-ACK feedback for the subset of HARQ process IDs. For example, referring to FIG. 4, the base station may receive, at 416, the Type 3 codebook from the UE 402 (e.g., including corresponding ACK/NACK for HARQ IDs). Receiving, at 416, the modified Type 3 HARQ-ACK codebook based on the one-shot trigger may be further based on a UE capability of the UE 402. The one-shot trigger may be transmitted, at 408, via a downlink assignment, and receiving, at 416, the modified Type 3 HARQ-ACK codebook including the HARQ-ACK feedback for the subset of HARQ process IDs may also be based on a UE capability of the UE 402. The reception, at 1006, may be performed by the reception component 1430 of the apparatus 1402 in FIG. 14.

Figure 11:
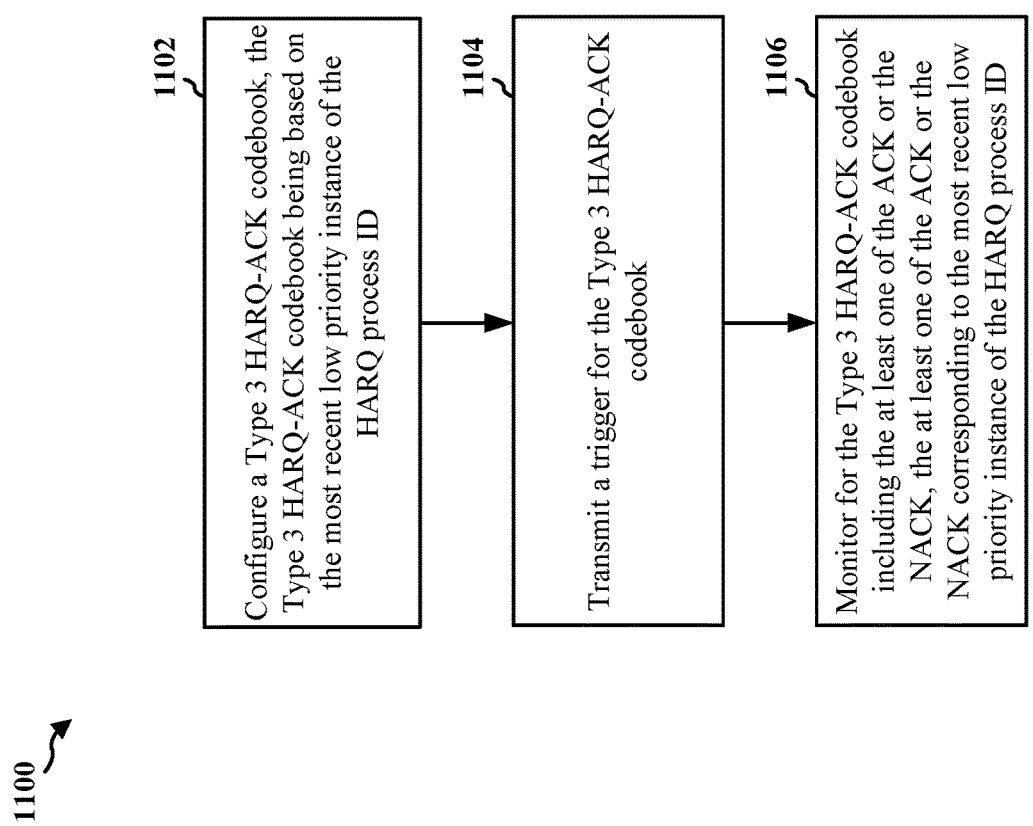
FIG. 11 is a flowchart of a method of wireless communication at a base station.

FIG. 11 is a flowchart 1100 of a method of wireless communication. The method may be performed by a base station (e.g., the base station 102/404, the apparatus 1402, etc.), which may include the memory 376 and which may be the entire base station 102/404 or a component of the base station 102/404, such as the TX processor 316, the RX processor 370, and/or the controller/processor 375.

At 1102, the base station may configure a Type 3 HARQ-ACK codebook, the Type 3 HARQ-ACK codebook being based on the most recent low priority instance of the HARQ process ID. For example, referring to FIG. 4, the base station 404 may configure, at 408, the Type 3 HARQ-ACK codebook for HARQ process IDs 502-504 (e.g., HARQ 0 through HARQ N). The most recent low priority instance 506c of the HARQ process ID 502 may occur prior to a high priority instance 506d of the HARQ process ID 502. In examples, the Type 3 HARQ-ACK codebook may be configured, at 408, based on a RRC configuration. The configuration, at 1102, may be performed by the configuration component 1442 of the apparatus 1402 in FIG. 14.

At 1104, the base station may transmit a trigger for the Type 3 HARQ-ACK codebook. For example, referring to FIGS. 4-5, the base station 404 may transmit, at 408, the trigger for the Type 3 HARQ-ACK codebook. The trigger for the Type 3 HARQ-ACK codebook may be transmitted, at 408, in DCI. In examples, the trigger transmitted, at 408, may be based on a number of bits configured to at least one of trigger the Type 3 HARQ-ACK codebook based on the most recent low priority instance (e.g., 506c/508d) of the HARQ process ID 502/504, trigger a Type 3 HARQ-ACK codebook based on a most recent instance (e.g., 506d/508d) of the HARQ process ID 502/504, or not trigger one or more of the Type 3 HARQ-ACK codebooks. The transmission, at 1104, may be performed by the transmission component 1434 of the apparatus 1402 in FIG. 14.

At 1106, the base station may monitor for the Type 3 HARQ-ACK codebook including the at least one of the ACK or the NACK, the at least one of the ACK or the NACK corresponding to the most recent low priority instance of the HARQ process ID. For example, referring to FIG. 4, the base station 404 may monitor, at 414, for the Type 3 HARQ-ACK codebook. The at least one of the ACK or NACK corresponding to the most recent low priority instance of the HARQ process ID may be based on a HARQ process ID not including a most recent instance of low priority for the HARQ process ID (e.g., the HARQ process ID may be associated with high priority instances since initialization). In aspects, an initialization condition of the HARQ process ID may correspond to a NACK. As such, the at least one of the ACK or NACK corresponding to the most recent low priority instance of the HARQ process ID may include the NACK based on the HARQ process ID not including the most recent instance of low priority for the HARQ process ID. The monitoring, at 1106, may be performed by the monitor component 1444 of the apparatus 1402 in FIG. 14.

Figure 12:
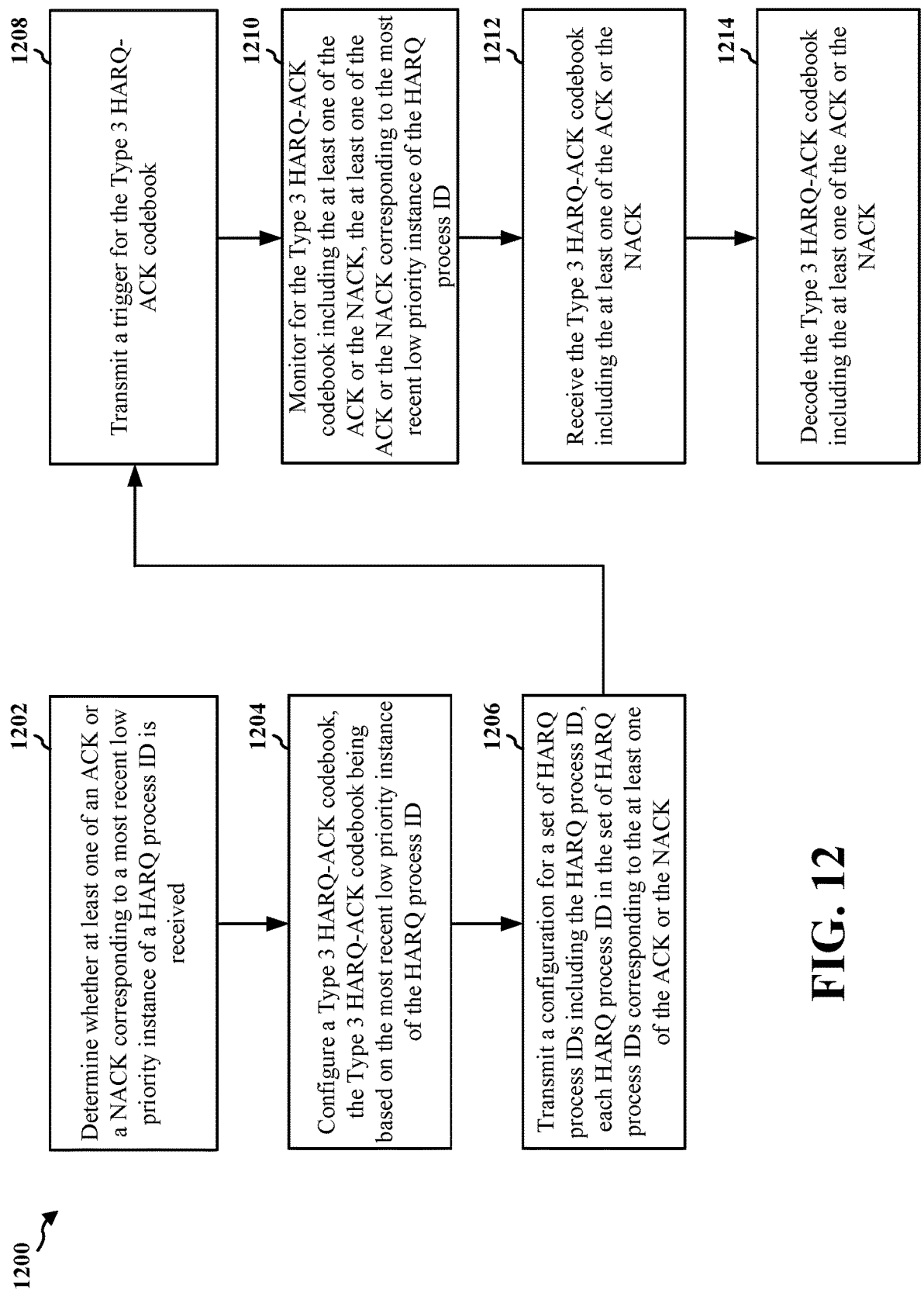
FIG. 12 is a flowchart of a method of wireless communication at a base station.

FIG. 12 is a flowchart 1200 of a method of wireless communication. The method may be performed by a base station (e.g., the base station 102/404, the apparatus 1402, etc.), which may include the memory 376 and which may be the entire base station 102/404 or a component of the base station 102/404, such as the TX processor 316, the RX processor 370, and/or the controller/processor 375.

At 1202, the base station may determine whether at least one of an ACK or a NACK corresponding to a most recent low priority instance of a HARQ process ID is received. For example, referring to FIGS. 4-5, the base station 404 may determine, at 406, whether an ACK/NACK is received for one or more HARQ process IDs. In examples, a trigger for a Type 3 HARQ-ACK codebook may be transmitted, at 408, when the at least one of the ACK or the NACK corresponding to the most recent low priority instance (e.g., 506c/508d) of the HARQ process ID 502/504 is not received. The determination, at 1202, may be performed by the determination component 1440 of the apparatus 1402 in FIG. 14.

At 1204, the base station may configure a Type 3 HARQ-ACK codebook, the Type 3 HARQ-ACK codebook being based on the most recent low priority instance of the HARQ process ID. For example, referring to FIG. 4, the base station 404 may configure, at 408, the Type 3 HARQ-ACK codebook for HARQ process IDs 502-504 (e.g., HARQ 0 through HARQ N). The most recent low priority instance 506c of the HARQ process ID 502 may occur prior to a high priority instance 506d of the HARQ process ID 502. In examples, the Type 3 HARQ-ACK codebook may be configured, at 408, based on a RRC configuration. The configuration, at 1204, may be performed by the configuration component 1442 of the apparatus 1402 in FIG. 14.

At 1206, the base station may transmit a configuration for a set of HARQ process IDs including the HARQ process ID, each HARQ process ID in the set of HARQ process IDs corresponding to the at least one of the ACK or the NACK, where at least one of the ACK or the NACK for each of the HARQ process IDs in the set of HARQ process IDs is received in the Type 3 HARQ-ACK codebook. For example, referring to FIGS. 4-5, the base station 404 may transmit, at 408, a Type 3 HARQ configuration for one or more HARQ process IDs. Each of the HARQ process IDs 502-504 may be associated with ACK/NACK 506a-508d that may be received, at 416, in a Type 3 codebook. The transmission, at 1206, may be performed by the transmission component 1434 of the apparatus 1402 in FIG. 14.

At 1208, the base station may transmit a trigger for the Type 3 HARQ-ACK codebook. For example, referring to FIGS. 4-5, the base station 404 may transmit, at 408, the trigger for the Type 3 HARQ-ACK codebook. The trigger for the Type 3 HARQ-ACK codebook may be transmitted, at 408, in DCI. In examples, the trigger transmitted, at 408, may be based on a number of bits configured to at least one of trigger the Type 3 HARQ-ACK codebook based on the most recent low priority instance (e.g., 506c/508d) of the HARQ process ID 502/504, trigger a Type 3 HARQ-ACK codebook based on a most recent instance (e.g., 506d/508d) of the HARQ process ID 502/504, or not trigger one or more of the Type 3 HARQ-ACK codebooks. The transmission, at 1208, may be performed by the transmission component 1434 of the apparatus 1402 in FIG. 14.

At 1210, the base station may monitor for the Type 3 HARQ-ACK codebook including the at least one of the ACK or the NACK, the at least one of the ACK or the NACK corresponding to the most recent low priority instance of the HARQ process ID. For example, referring to FIG. 4, the base station 404 may monitor, at 414, for the Type 3 HARQ-ACK codebook. The at least one of the ACK or NACK corresponding to the most recent low priority instance of the HARQ process ID may be based on a HARQ process ID not including a most recent instance of low priority for the HARQ process ID (e.g., the HARQ process ID may be associated with high priority instances since initialization). In aspects, an initialization condition of the HARQ process ID may correspond to a NACK. As such, the at least one of the ACK or NACK corresponding to the most recent low priority instance of the HARQ process ID may include the NACK based on the HARQ process ID not including the most recent instance of low priority for the HARQ process ID. The monitoring, at 1210, may be performed by the monitor component 1444 of the apparatus 1402 in FIG. 14.

At 1212, the base station may receive the Type 3 HARQ-ACK codebook including the at least one of the ACK or the NACK. For example, referring to FIG. 4, the base station 404 may receive, at 416, the Type 3 codebook based on the most recent low priority instance and including a corresponding ACK/NACK for the HARQ ID. The Type 3 HARQ-ACK codebook including at least one of the ACK or the NACK may be received, at 416, if a NDI is not configured with the HARQ process ID. Further, the Type 3 HARQ-ACK codebook including at least one of the ACK or the NACK may be received, at 416, with a second Type 3 HARQ-ACK codebook based on a most recent (e.g., high priority or low priority) instance of the HARQ process ID. The reception, at 1212, may be performed by the reception component 1430 of the apparatus 1402 in FIG. 14.

At 1214, the base station may decode the Type 3 HARQ-ACK codebook including the at least one of the ACK or the NACK. For example, referring to FIG. 4, the base station 404 may decode, at 418, the Type 3 HARQ-ACK codebook received, at 416, including a corresponding ACK/NACK. The decoding, at 1214, may be performed by the decoder component 1446 of the apparatus 1402 in FIG. 14.

Figure 13:
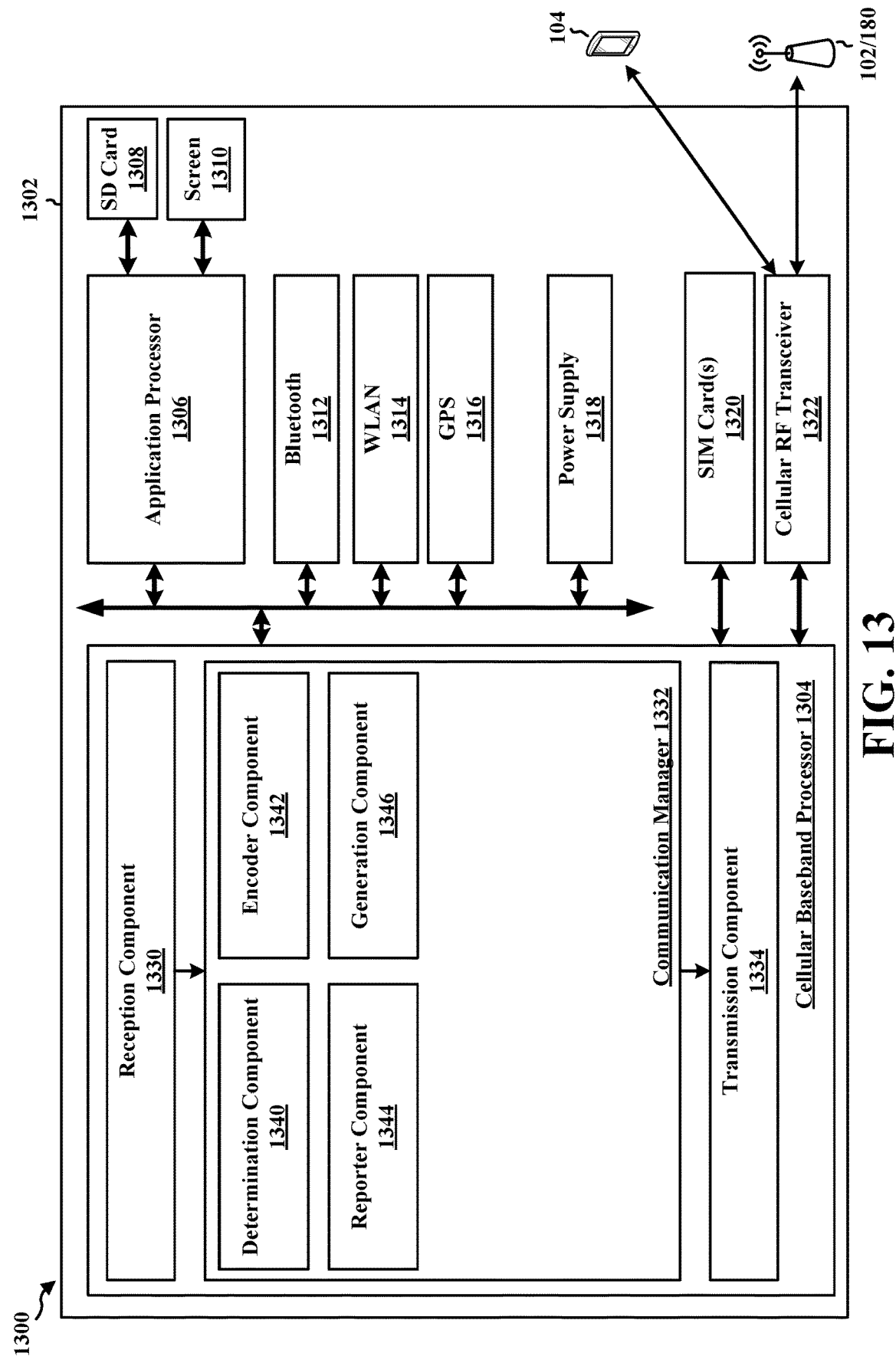
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the aforediscussed additional modules of the apparatus 1302.

The reception component 1330 may be configured, e.g., as described in connection with 802, 902, and 904, to receive a configuration for a set of HARQ process IDs including a HARQ process ID, each HARQ process ID in the set of HARQ process IDs corresponding to least one of an ACK or a NACK; and to receive a trigger for a Type 3 HARQ-ACK codebook, the Type 3 HARQ-ACK codebook based on a most recent low priority instance of the HARQ process ID. The communication manager 1332 includes a determination component 1340 that is configured, e.g., as described in connection with 804, 906a and 906b, to determine the most recent low priority instance of the HARQ process ID, the most recent low priority instance corresponding to at least one of the ACK or the NACK; and to determine whether the HARQ process ID includes a most recent instance of low priority for the HARQ process ID. The communication manager 1332 further includes an encoder component 1342 that is configured, e.g., as described in connection with 908, to encode the Type 3 HARQ-ACK codebook including at least one of the ACK or the NACK. The communication manager 1332 further includes a reporter component 1344 that is configured, e.g., as described in connection with 806, 910, and 912, to report the Type 3 HARQ-ACK codebook including the at least one of the ACK or the NACK corresponding to the determined most recent low priority instance of the HARQ process ID; and to report the at least one of the ACK or NACK for each of the HARQ process IDs in the set of HARQ process IDs in the Type 3 HARQ-ACK codebook.

The reception component 1330 may be configured, e.g., as described in connection with 602, 604, 702, and 704, to receive a configuration for reporting HARQ-ACK feedback for a subset of HARQ process IDs included in a set of HARQ process IDs—the set of HARQ process IDs is associated with a Type 3 HARQ-ACK codebook, and the subset of HARQ process IDs is associated with a modified Type 3 HARQ-ACK codebook that is smaller than the Type 3 HARQ-ACK codebook; and to receive, based on the configuration, a trigger for the modified Type 3 HARQ-ACK codebook. The communication manager 1332 includes a generation component 1346 that is configured, e.g., as described in connection with 706, to generate the modified Type 3 HARQ-ACK codebook to correspond to one or more of an order of the subset of HARQ process IDs or at least one serving cell. The reporter component 1344 included in the communication manager 1332 is further configured, as described in connection with 606 and 708, to report, based on the trigger, the modified Type 3 HARQ-ACK codebook including the HARQ-ACK feedback for the subset of HARQ process IDs.

The apparatus may include additional components that perform each of the blocks of the algorithm in the aforementioned flowcharts of FIGS. 6-9. As such, each block in the aforementioned flowcharts of FIGS. 6-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for receiving a trigger for a Type 3 HARQ-ACK codebook, the Type 3 HARQ-ACK codebook based on a most recent low priority instance of a HARQ process ID; means for determining the most recent low priority instance of the HARQ process ID, the most recent low priority instance corresponding to at least one of an ACK or a NACK; and means for reporting the Type 3 HARQ-ACK codebook including the at least one of the ACK or the NACK corresponding to the determined most recent low priority instance of the HARQ process ID. The apparatus 1302 may further include means for receiving a configuration for a set of HARQ process IDs including the HARQ process ID, each HARQ process ID in the set of HARQ process IDs corresponding to the at least one of the ACK or NACK; and means for reporting the at least one of the ACK or NACK for each of the HARQ process IDs in the set of HARQ process IDs in the Type 3 HARQ-ACK codebook. The apparatus 1302 may further include means for encoding the Type 3 HARQ-ACK codebook including at least one of the ACK or the NACK.

In a further configuration, the apparatus 1302, and in particular the cellular baseband processor 1304, includes means for receiving a configuration for reporting HARQ-ACK feedback for a subset of HARQ process IDs included in a set of HARQ process IDs, the set of HARQ process IDs associated with a Type 3 HARQ-ACK codebook, the subset of HARQ process IDs associated with a modified Type 3 HARQ-ACK codebook that is smaller than the Type 3 HARQ-ACK codebook; means for receiving, based on the configuration, a trigger for the modified Type 3 HARQ-ACK codebook; and means for reporting, based on the trigger, the modified Type 3 HARQ-ACK codebook including the HARQ-ACK feedback for the subset of HARQ process IDs. The apparatus 1302 further includes means for generating the modified Type 3 HARQ-ACK codebook to correspond to one or more of an order of the subset of HARQ process IDs or at least one serving cell.

The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
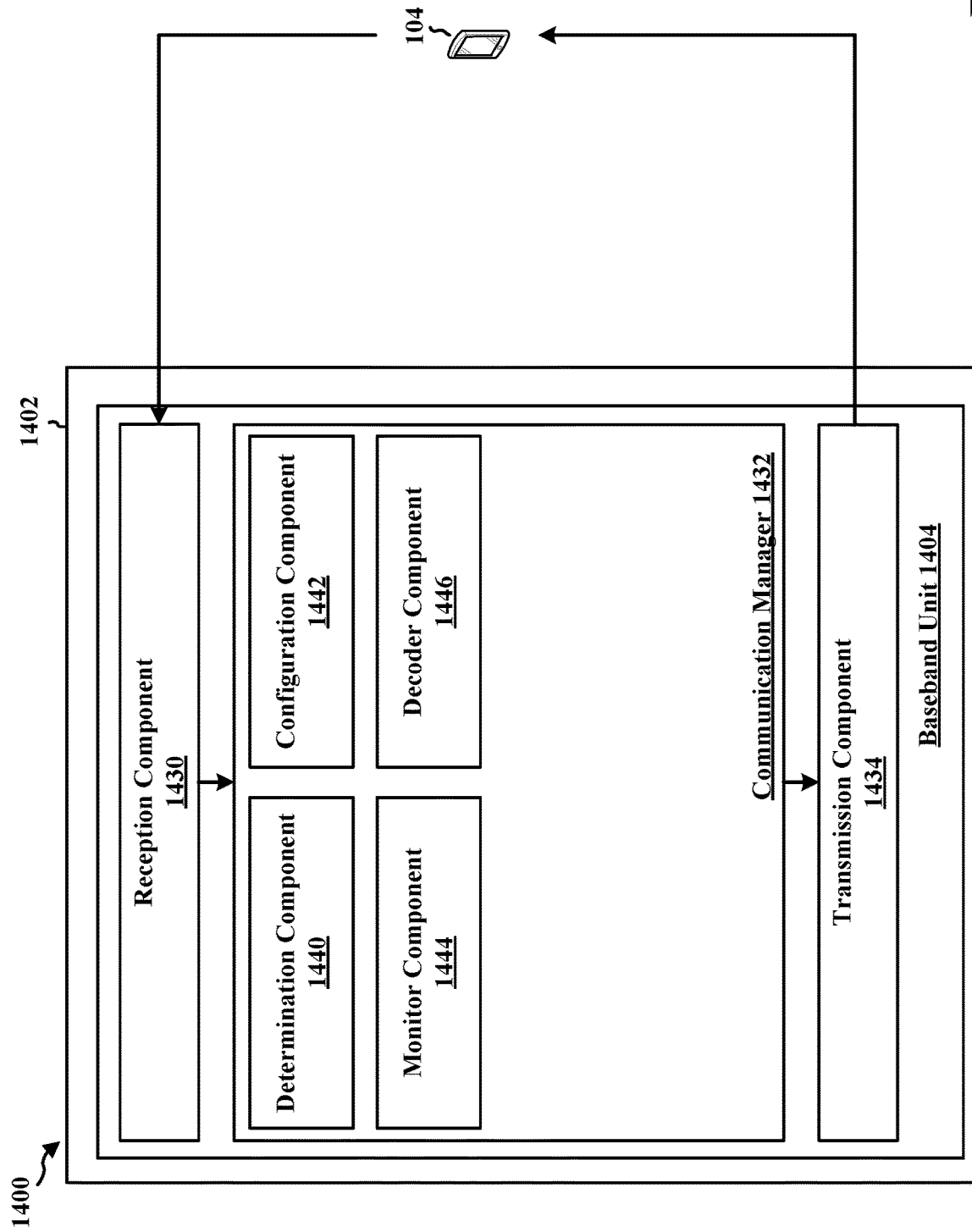
FIG. 14 is a diagram illustrating an example of a hardware implementation for an example apparatus.

FIG. 14 is a diagram 1400 illustrating an example of a hardware implementation for an apparatus 1402. The apparatus 1402 is a BS and includes a baseband unit 1404. The baseband unit 1404 may communicate through a cellular RF transceiver with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the BS 310 and may include the memory 376 and/or at least one of the TX processor 316, the RX processor 370, and the controller/processor 375.

The reception component 1430 may be configured, e.g., as described in connection with 1212, to receive the Type 3 HARQ-ACK codebook including the at least one of the ACK or the NACK. The communication manager 1432 includes a determination component 1440 that is configured, e.g., as described in connection with 1202, to determine whether at least one of an ACK or a NACK corresponding to a most recent low priority instance of a HARQ process ID is received. The communication manager 1432 further includes a configuration component 1442 that is configured, e.g., as described in connection with 1102 and 1204, to configure a Type 3 HARQ-ACK codebook, the Type 3 HARQ-ACK codebook being based on the most recent low priority instance of the HARQ process ID. The communication manager 1432 further includes a monitor component 1444 that is configured, e.g., as described in connection with 1106 and 1210, to monitor for the Type 3 HARQ-ACK codebook including the at least one of the ACK or the NACK, the at least one of the ACK or the NACK corresponding to the most recent low priority instance of the HARQ process ID. The communication manager 1432 further includes a decoder component 1446 that is configured, e.g., as described in connection with 1214, to decode the Type 3 HARQ-ACK codebook including the at least one of the ACK or the NACK. The transmission component 1434 may be configured, e.g., as described in connection with 1104, 1206, and 1208, to transmit a configuration for a set of HARQ process IDs including the HARQ process ID, each HARQ process ID in the set of HARQ process IDs corresponding to the at least one of the ACK or the NACK; and to transmit a trigger for the Type 3 HARQ-ACK codebook.

The reception component 1430 may be further configured, e.g., as described in connection with 1006, to receive, based on the trigger, the modified Type 3 HARQ-ACK codebook including the HARQ-ACK feedback for the subset of HARQ process IDs. The transmission component 1434 may be further configured, e.g., as described in connection with 1002 and 1004, to transmit a configuration to a UE for HARQ-ACK feedback for a subset of HARQ process IDs included in a set of HARQ process IDs—the set of HARQ process IDs is associated with a Type 3 HARQ-ACK codebook, and the subset of HARQ process IDs is associated with a modified Type 3 HARQ-ACK codebook that is smaller than the Type 3 HARQ-ACK codebook; and to transmit, based on the configuration, a trigger for the modified Type 3 HARQ-ACK codebook.

The apparatus may include additional components that perform each of the blocks of the algorithm in the aforementioned flowcharts of FIGS. 10-12. As such, each block in the aforementioned flowcharts of FIGS. 10-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for configuring a Type 3 HARQ-ACK codebook, the Type 3 HARQ-ACK codebook being based on a most recent low priority instance of a HARQ process identifier ID; means for transmitting a trigger for the Type 3 HARQ-ACK codebook; and means for monitoring for the Type 3 HARQ-ACK codebook including at least one of an ACK or a NACK, the at least one of the ACK or the NACK corresponding to the most recent low priority instance of the HARQ process ID. The apparatus 1402 may further include means for receiving the Type 3 HARQ-ACK codebook including at least one of the ACK or the NACK. The apparatus 1402 may further include means for transmitting a configuration for a set of HARQ process IDs including the HARQ process ID, each HARQ process ID in the set of HARQ process IDs corresponding to the at least one of the ACK or NACK, where at least one of the ACK or the NACK for each of the HARQ process IDs in the set of HARQ process IDs is received in the Type 3 HARQ-ACK codebook. The apparatus 1402 may further include means for decoding the Type 3 HARQ-ACK codebook including at least one of the ACK or the NACK. The apparatus 1402 may further include means for determining whether the at least one of the ACK or the NACK corresponding to the most recent low priority instance of the HARQ process ID is received.

In a further configuration, the apparatus 1402, and in particular the baseband unit 1404, includes means for transmitting a configuration to a UE for HARQ-ACK feedback for a subset of HARQ process IDs included in a set of HARQ process IDs, the set of HARQ process IDs associated with a Type 3 HARQ-ACK codebook, the subset of HARQ process IDs associated with a modified Type 3 HARQ-ACK codebook that is smaller than the Type 3 HARQ-ACK codebook; transmitting, based on the configuration, a trigger for the modified Type 3 HARQ-ACK codebook; and receiving, based on the trigger, the modified Type 3 HARQ-ACK codebook including the HARQ-ACK feedback for the subset of HARQ process IDs.

The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Accordingly, for Type 3 HARQ-ACK codebooks, instead of the UE reporting the most recent instance of the HARQ process IDs, a low priority mode may be implemented where the UE may report, for each HARQ process, a most recent low priority instance of the HARQ process ID. That is, if HARQ process X is initially associated with a low priority transmission in slot N but is later associated with a high priority transmission in slot M, the UE may retransmit the ACK/NACK for HARQ process X in slot N when the Type 3 codebook is triggered by the base station, rather than retransmitting the ACK/NACK for HARQ process X in slot M. In this manner, the UE may retransmit low priority instances of the of the HARQ process IDs, even if a particular HARQ process ID is associated with a more recent instance of high priority ACK/NACK.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive a configuration for reporting HARQ-ACK feedback for a subset of HARQ process IDs included in a set of HARQ process IDs, the set of HARQ process IDs associated with a Type 3 HARQ-ACK codebook, the subset of HARQ process IDs associated with a modified Type 3 HARQ-ACK codebook that is smaller than the Type 3 HARQ-ACK codebook; receive, based on the configuration, a trigger for the modified Type 3 HARQ-ACK codebook; and report, based on the trigger, the modified Type 3 HARQ-ACK codebook including the HARQ-ACK feedback for the subset of HARQ process IDs.

Aspect 2 may be combined with aspect 1 and includes that the configuration received for the HARQ-ACK feedback for the subset of HARQ process IDs corresponds to an RRC configuration.

Aspect 3 may be combined with any of aspects 1-2 and includes that a size of the modified Type 3 HARQ-ACK codebook is indicated via the RRC configuration.

Aspect 4 may be combined with any of aspects 1-3 and includes that the at least one processor is further configured to generate the modified Type 3 HARQ-ACK codebook to correspond to one or more of an order of the subset of HARQ process IDs or at least one serving cell.

Aspect 5 may be combined with any of aspects 1-4 and includes that the trigger is a one-shot trigger for a HARQ-ACK retransmission on a PUCCH resource.

Aspect 6 may be combined with any of aspects 1-5 and includes that the one-shot trigger is received via a downlink assignment, and where the at least one processor is further configured to report the modified Type 3 HARQ-ACK codebook based on the one-shot trigger and based on a capability of the UE.

Aspect 7 may be combined with any of aspects 1-6 and includes that the at least one processor if further configured to report the modified Type 3 HARQ-ACK codebook based on a capability of the UE.

Aspect 8 may be combined with any of aspects 1-7 and includes that the trigger for the modified Type 3 HARQ-ACK codebook is based on a first DCI bit that is different from a second DCI bit associated with a second trigger for the Type 3 HARQ-ACK codebook.

Aspect 9 is an apparatus for wireless communication at a UE including at least one processor coupled to a memory and configured to receive a trigger for a modified Type 3 HARQ-ACK codebook, the modified Type 3 HARQ-ACK codebook based on a most recent low priority instance of a HARQ process ID, the most recent low priority instance of the HARQ process ID corresponding to at least one of an ACK or a NACK; and report the modified Type 3 HARQ-ACK codebook including the at least one of the ACK or the NACK based on the most recent low priority instance of the HARQ process ID.

Aspect 10 may be combined with aspect 9 and includes that the most recent low priority instance of the HARQ process ID occurs prior to a high priority instance of the HARQ process ID.

Aspect 11 may be combined with any of aspects 9-10 and includes that the NACK is reported in the modified Type 3 HARQ-ACK codebook if the HARQ process ID does not include the most recent low priority instance of the HARQ process ID.

Aspect 12 may be combined with any of aspects 9-11 and includes that an initialization condition of the HARQ process ID corresponds to the NACK.

Aspect 13 may be combined with any of aspects 9-12 and includes that the Type 3 HARQ-ACK codebook including the at least one of the ACK or the NACK is reported if an NDI is not configured with the HARQ process ID.

Aspect 14 may be combined with any of aspects 9-13 and includes that the at least one processor is further configured to: receive a configuration for a subset of HARQ process IDs including the HARQ process ID, each HARQ process ID in the subset of HARQ process IDs corresponding to the at least one of the ACK or the NACK; and report the at least one of the ACK or the NACK for each of the HARQ process IDs in the subset of HARQ process IDs in the modified Type 3 HARQ-ACK codebook.

Aspect 15 may be combined with any of aspects 9-14 and includes that the modified Type 3 HARQ-ACK codebook including the at least one of the ACK or the NACK is configured based on an RRC configuration.

Aspect 16 is an apparatus for wireless communication at a base station including at least one processor coupled to a memory and configured to transmit a configuration to a UE for HARQ-ACK feedback for a subset of HARQ process IDs included in a set of HARQ process IDs, the set of HARQ process IDs associated with a Type 3 HARQ-ACK codebook, the subset of HARQ process IDs associated with a modified Type 3 HARQ-ACK codebook that is smaller than the Type 3 HARQ-ACK codebook; transmit, based on the configuration, a trigger for the modified Type 3 HARQ-ACK codebook; and receive, based on the trigger, the modified Type 3 HARQ-ACK codebook including the HARQ-ACK feedback for the subset of HARQ process IDs.

Aspect 17 may be combined with aspect 16 and includes that the configuration transmitted for the HARQ-ACK feedback for the subset of HARQ process IDs corresponds to an RRC configuration.

Aspect 18 may be combined with any of aspects 16-17 and includes that a size of the modified Type 3 HARQ-ACK codebook is indicated via the RRC configuration.

Aspect 19 may be combined with any of aspects 16-18 and includes that the modified Type 3 HARQ-ACK codebook corresponds to one or more of an order of the subset of HARQ process IDs or at least one serving cell.

Aspect 20 may be combined with any of aspects 16-19 and includes that the trigger is a one-shot trigger for a HARQ-ACK retransmission on a PUCCH resource.

Aspect 21 may be combined with any of aspects 16-20 and includes that the at least one processor is further configured to receive the modified Type 3 HARQ-ACK codebook based on the one-shot trigger and based on a capability of the UE.

Aspect 22 may be combined with any of aspects 16-21 and includes that the one-shot trigger is transmitted via a downlink assignment, and includes that the at least one processor is further configured to receive the modified Type 3 HARQ-ACK codebook based on a UE capability of the UE.

Aspect 23 may be combined with any of aspects 16-22 and includes that the trigger for the modified Type 3 HARQ-ACK codebook is based on a first DCI bit that is different from a second DCI bit associated with a second trigger for the Type 3 HARQ-ACK codebook.

Aspect 24 is an apparatus for wireless communication at a base station including at least one processor coupled to a memory and configured to configure a modified Type 3 HARQ-ACK codebook, the modified Type 3 HARQ-ACK codebook being based on a most recent low priority instance of a HARQ ID; transmit a trigger for the modified Type 3 HARQ-ACK codebook; and monitor for the modified Type 3 HARQ-ACK codebook including at least one of an ACK or a NACK, the at least one of the ACK or the NACK corresponding to the most recent low priority instance of the HARQ process ID.

Aspect 25 may be combined with aspect 24 and includes that the most recent low priority instance of the HARQ process ID occurs prior to a high priority instance of the HARQ process ID.

Aspect 26 may be combined with any of aspects 24-25 and includes that an initialization condition of the HARQ process ID corresponds to the NACK.

Aspect 27 may be combined with any of aspects 24-26 and includes that the at least one processor is further configured to receive the modified Type 3 HARQ-ACK codebook including at least one of the ACK or the NACK.

Aspect 28 may be combined with any of aspects 24-27 and includes that the modified Type 3 HARQ-ACK codebook including the at least one of the ACK or the NACK is received if an NDI is not configured with the HARQ process ID.

Aspect 29 may be combined with any of aspects 24-28 and includes that the at least one processor is further configured to transmit a configuration for a subset of HARQ process IDs including the HARQ process ID, each HARQ process ID in the subset of HARQ process IDs corresponding to the at least one of the ACK or the NACK.

Aspect 30 may be combined with any of aspects 24-29 and includes that the modified Type 3 HARQ-ACK codebook is configured based on an RRC configuration.

Aspect 31 may be combined with any of aspects 1-30 and further includes at least one of a transceiver or an antenna coupled to the at least one processor to perform any of aspects 1-30.

Aspect 32 is a method of wireless communication for implementing any of aspects 1-31.

Aspect 33 is an apparatus for wireless communication including means for implementing any of aspects 1-31.

Aspect 34 is a computer-readable medium storing computer executable code, the code when executed by at least one processor causes the at least one processor to implement any of aspects 1-31.

What is claimed is:

1. An apparatus for wireless communication at a user equipment (UE), comprising:
   a memory; and
   at least one processor coupled to the memory and configured to:
      receive a configuration for reporting hybrid automatic repeat request (HARQ)-acknowledgment (ACK)

(HARQ-ACK) feedback for a subset of HARQ process identifiers (IDs) included in a set of HARQ process IDs, the set of HARQ process IDs associated with a Type 3 HARQ-ACK codebook, the subset of HARQ process IDs associated with a modified Type 3 HARQ-ACK codebook that is smaller than the Type 3 HARQ-ACK codebook;
receive, based on the configuration, a trigger for the modified Type 3 HARQ-ACK codebook; and
report, based on the trigger, the modified Type 3 HARQ-ACK codebook including the HARQ-ACK feedback for the subset of HARQ process IDs.

2. The apparatus of claim 1, wherein the configuration received for the HARQ-ACK feedback for the subset of HARQ process IDs corresponds to a radio resource control (RRC) configuration.

3. The apparatus of claim 2, wherein a size of the modified Type 3 HARQ-ACK codebook is indicated via the RRC configuration.

4. The apparatus of claim 1, wherein the at least one processor is further configured to generate the modified Type 3 HARQ-ACK codebook to correspond to one or more of an order of the subset of HARQ process IDs or at least one serving cell.

5. The apparatus of claim 1, wherein the trigger is a one-shot trigger for a HARQ-ACK retransmission on a physical uplink control channel (PUCCH) resource.

6. The apparatus of claim 5, wherein the one-shot trigger is received via a downlink assignment, and wherein the at least one processor is further configured to report the modified Type 3 HARQ-ACK codebook based on the one-shot trigger and based on a capability of the UE.

7. The apparatus of claim 1, wherein the at least one processor is further configured to report the modified Type 3 HARQ-ACK codebook based on a capability of the UE.

8. The apparatus of claim 1, wherein the trigger for the modified Type 3 HARQ-ACK codebook is based on a first downlink control information (DCI) bit that is different from a second DCI bit associated with a second trigger for the Type 3 HARQ-ACK codebook.

9. The apparatus of claim 1, further comprising at least one of a transceiver or an antenna coupled to the at least one processor to at least one of receive the configuration, receive the trigger for the modified Type 3 HARQ-ACK codebook, or report the modified Type 3 HARQ-ACK codebook.

10. An apparatus for wireless communication at a user equipment (UE), comprising:
a memory; and
at least one processor coupled to the memory and configured to:
receive a trigger for a modified Type 3 hybrid automatic repeat request (HARQ)-acknowledgment (ACK) (HARQ-ACK) codebook, the modified Type 3 HARQ-ACK codebook based on a most recent low priority instance of a HARQ process identifier (ID), the most recent low priority instance of the HARQ process ID corresponding to at least one of an ACK or a negative ACK (NACK); and
report the modified Type 3 HARQ-ACK codebook including the at least one of the ACK or the NACK based on the most recent low priority instance of the HARQ process ID.

11. The apparatus of claim 10, wherein the most recent low priority instance of the HARQ process ID occurs prior to a high priority instance of the HARQ process ID.

12. The apparatus of claim 10, wherein the NACK is reported in the modified Type 3 HARQ-ACK codebook if the HARQ process ID does not include the most recent low priority instance of the HARQ process ID.

13. The apparatus of claim 10, wherein an initialization condition of the HARQ process ID corresponds to the NACK.

14. The apparatus of claim 10, wherein the Type 3 HARQ-ACK codebook including the at least one of the ACK or the NACK is reported if a new data indicator (NDI) is not configured with the HARQ process ID.

15. The apparatus of claim 10, wherein the at least one processor is further configured to:
receive a configuration for a subset of HARQ process IDs including the HARQ process ID, each HARQ process ID in the subset of HARQ process IDs corresponding to the at least one of the ACK or the NACK; and
report the at least one of the ACK or the NACK for each of the HARQ process IDs in the subset of HARQ process IDs in the modified Type 3 HARQ-ACK codebook.

16. The apparatus of claim 10, wherein the modified Type 3 HARQ-ACK codebook including the at least one of the ACK or the NACK is configured based on a radio resource control (RRC) configuration.

17. The apparatus of claim 10, further comprising at least one of a transceiver or an antenna coupled to the at least one processor to at least one of receive the trigger for the modified Type 3 HARQ-ACK codebook or report the modified Type 3 HARQ-ACK codebook.

18. An apparatus for wireless communication at a base station, comprising:
a memory; and
at least one processor coupled to the memory and configured to:
transmit a configuration to a user equipment (UE) for hybrid automatic repeat request (HARQ)-acknowledgment (ACK) (HARQ-ACK) feedback for a subset of HARQ process identifiers (IDs) included in a set of HARQ process IDs, the set of HARQ process IDs associated with a Type 3 HARQ-ACK codebook, the subset of HARQ process IDs associated with a modified Type 3 HARQ-ACK codebook that is smaller than the Type 3 HARQ-ACK codebook;
transmit, based on the configuration, a trigger for the modified Type 3 HARQ-ACK codebook; and
receive, based on the trigger, the modified Type 3 HARQ-ACK codebook including the HARQ-ACK feedback for the subset of HARQ process IDs.

19. The apparatus of claim 18, wherein the configuration transmitted for the HARQ-ACK feedback for the subset of HARQ process IDs corresponds to a radio resource control (RRC) configuration.

20. The apparatus of claim 19, wherein a size of the modified Type 3 HARQ-ACK codebook is indicated via the RRC configuration.

21. The apparatus of claim 18, wherein the modified Type 3 HARQ-ACK codebook corresponds to one or more of an order of the subset of HARQ process IDs or at least one serving cell.

22. The apparatus of claim 18, wherein the trigger is a one-shot trigger for a HARQ-ACK retransmission on a physical uplink control channel (PUCCH) resource.

23. The apparatus of claim 22, wherein the at least one processor is further configured to receive the modified Type 3 HARQ-ACK codebook based on the one-shot trigger and based on a capability of the UE.

24. The apparatus of claim 22, wherein the one-shot trigger is transmitted via a downlink assignment, and wherein the at least one processor is further configured to receive the modified Type 3 HARQ-ACK codebook based on a UE capability of the UE.

25. The apparatus of claim 18, wherein the trigger for the modified Type 3 HARQ-ACK codebook is based on a first downlink control information (DCI) bit that is different from a second DCI bit associated with a second trigger for the Type 3 HARQ-ACK codebook.

26. The apparatus of claim 18, further comprising at least one of a transceiver or an antenna coupled to the at least one processor to at least one of transmit the configuration for the HARQ-ACK feedback for the subset of HARQ process IDs, transmit the trigger for the modified Type 3 HARQ-ACK codebook, or receive the modified Type 3 HARQ-ACK codebook.

27. An apparatus for wireless communication at a base station, comprising:
   a memory; and
   at least one processor coupled to the memory and configured to:
      configure a modified Type 3 hybrid automatic repeat request (HARQ) acknowledgment (ACK) (HARQ-ACK) codebook, the modified Type 3 HARQ-ACK codebook being based on a most recent low priority instance of a HARQ process identifier (ID);
      transmit a trigger for the modified Type 3 HARQ-ACK codebook; and
      monitor for the modified Type 3 HARQ-ACK codebook including at least one of an ACK or a negative ACK (NACK), the at least one of the ACK or the NACK corresponding to the most recent low priority instance of the HARQ process ID.

28. The apparatus of claim 27, further comprising at least one of a transceiver or an antenna coupled to the at least one processor to receive the modified Type 3 HARQ-ACK codebook including at least one of the ACK or the NACK.

29. The apparatus of claim 27, wherein the at least one processor is further configured to transmit a configuration for a subset of HARQ process IDs including the HARQ process ID, each HARQ process ID in the subset of HARQ process IDs corresponding to the at least one of the ACK or the NACK.

30. The apparatus of claim 27, wherein the modified Type 3 HARQ-ACK codebook is configured based on a radio resource control (RRC) configuration.

* * * * *